United States Patent
Nishikawa et al.

(10) Patent No.: US 9,240,076 B2
(45) Date of Patent: Jan. 19, 2016

(54) INFORMATION PROCESSING APPARATUS, SERVER APPARATUS, INFORMATION PROCESSING METHOD

(71) Applicant: PANASONIC CORPORATION, Osaka (JP)

(72) Inventors: Takayuki Nishikawa, Osaka (JP); Ryo Yokoyama, Kanagawa (JP); Keisuke Hayata, Kanagawa (JP); Masaki Takahashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/111,917

(22) PCT Filed: Mar. 15, 2013

(86) PCT No.: PCT/JP2013/001775
§ 371 (c)(1),
(2) Date: Oct. 15, 2013

(87) PCT Pub. No.: WO2013/145614
PCT Pub. Date: Oct. 3, 2013

(65) Prior Publication Data
US 2014/0063065 A1 Mar. 6, 2014

(30) Foreign Application Priority Data

Mar. 27, 2012 (JP) ................................. 2012-071031

(51) Int. Cl.
*G09G 5/00* (2006.01)
*G06T 19/00* (2011.01)
(Continued)

(52) U.S. Cl.
CPC .............. *G06T 19/006* (2013.01); *A63F 13/06* (2013.01); *A63F 13/12* (2013.01); *A63F 2300/1093* (2013.01); *A63F 2300/5573* (2013.01); *A63F 2300/6684* (2013.01); *A63F 2300/69* (2013.01)

(58) Field of Classification Search
None
See application file for complete search history.

(56) References Cited

U.S. PATENT DOCUMENTS 6,058,397 A * 5/2000 Barrus et al.
2002/0037768 A1 3/2002 Ohshima
(Continued)

FOREIGN PATENT DOCUMENTS

JP 2002-112286 A 4/2002

OTHER PUBLICATIONS

Yuji Suzaki, et al., A System Sharing the Information of Work in Remote MR Space Using a Virtual Sthicker, Graduate School of Science and Technology Keio University, Apr. 17, 2006.
(Continued)

*Primary Examiner* — M Good Johnson
(74) *Attorney, Agent, or Firm* — Pearne & Gordon LLP

(57) ABSTRACT

Disclosed is an information processing apparatus including virtual object management section (104) that manages virtual object management information of the information processing apparatus thereof on a virtual object disposed in an augmented real space shared by a group to which this information processing apparatus belongs. Communication section (107) receives virtual object management information of another information processing apparatus from this other information processing apparatus belonging to another group, the information regarding a virtual object disposed in an augmented real space shared in the other group. Reference point setting section (103) sets a common reference point based on the virtual object management information of the information processing apparatus and the virtual object management information of the other information processing apparatus, the common reference point being commonly used by the other group and the group to which the information processing apparatus belongs.

11 Claims, 14 Drawing Sheets

(51) Int. Cl.
*A63F 13/20* (2014.01)
*A63F 13/30* (2014.01)

(56) References Cited

U.S. PATENT DOCUMENTS

| | | | |
|---|---|---|---|
| 2011/0161875 A1* | 6/2011 | Kankainen | 715/810 |
| 2011/0216002 A1 | 9/2011 | Weising et al. | |
| 2011/0216060 A1 | 9/2011 | Weising et al. | |
| 2012/0001938 A1* | 1/2012 | Sandberg | 345/633 |
| 2012/0176410 A1* | 7/2012 | Meier et al. | 345/633 |
| 2013/0073988 A1* | 3/2013 | Groten et al. | 715/753 |
| 2013/0135315 A1* | 5/2013 | Bares et al. | 345/473 |

OTHER PUBLICATIONS

International Search Report for Application No. PCT/JP2013/001775 dated Apr. 16, 2013.

Yuji Suzuki, et al, A System Sharing the Information of Work in Remote MR Space Using a Virtual Sthicker, Graduate School of Science and Technology Keio University, Aug. 31, 2006.

* cited by examiner

FIG. 2A

| VIRTUAL OBJECT ID | SHAPE DATA | MANAGEMENT APPARATUS ID | MANAGEMENT GROUP ID | POSITION INFORMATION |
|---|---|---|---|---|
| 221 | (cylinder) | 211 | 200 | $(X_{221}, Y_{221}, Z_{221})$ |
| 222 | (cube) | 211 | 200 | $(X_{222}, Y_{222}, Z_{222})$ |
| 223 | (pyramid) | 212 | 200 | $(X_{223}, Y_{223}, Z_{223})$ |
| 321 | (cylinder) | 311 | 300 | $(X_{321}, Y_{321}, Z_{321})$ |
| 322 | (box) | 312 | 300 | $(X_{322}, Y_{322}, Z_{322})$ |

FIG. 2B

| GROUP ID | INFORMATION PROCESSING APPARATUS NUMBER |
|---|---|
| 200 | 3 |
| 300 | 2 |

FIG. 2C

| INFORMATION PROCESSING APPARATUS ID | BELONGING GROUP ID |
|---|---|
| 211 | 200 |

| INFORMATION PROCESSING APPARATUS ID (409) | BELONGING GROUP ID (410) |
|---|---|
| 211 | 200 |
| 212 | 200 |
| 213 | 200 |
| 311 | 300 |
| 312 | 300 |

FIG. 12A

| GROUP ID (411) | SHARED GROUP ID (412) |
|---|---|
| 200 | 300 |
| 300 | 200 |

FIG. 12B

INFORMATION PROCESSING APPARATUS, SERVER APPARATUS, INFORMATION PROCESSING METHOD

TECHNICAL FIELD

The present invention relates to an information processing apparatus, a server apparatus, and an information processing method which perform display by superimposing computer graphics on an image of a real space, using augmented reality technology.

BACKGROUND ART

In recent years, as an example of augmented reality (AR) technology, display by superimposing computer graphics (hereinafter, referred to as CG) on an image of a real space captured by a camera has become common. That is, an object drawn by CG (hereinafter, referred to as a virtual object) is disposed within a virtual space associated with the position of the real space, and thus is displayed by superimposition on the image of the real space in a form matching the viewpoint of a user. Thereby, the user can feel as if the virtual object is present in the real space. Hereinafter, the virtual space in which the virtual object is disposed in association with the position of the real space is referred to as an "augmented real space."

In augmented reality technology, a technique in which a plurality of users share an augmented real space is disclosed in, for example, Patent Literature (hereinafter, abbreviated as "PTL") 1. PTL 1 discloses a technique for sharing position information of a reference point serving as a reference when the augmented real space is constructed, among a plurality of users (hereinafter, referred to as a sharing procedure). In the technique of PTL 1, it is possible to form a group of users sharing the augmented real space which is constructed on the basis of a predetermined reference point.

The technique disclosed in PTL 1 assumes a situation where a plurality of groups formed gather together and all the users belonging to each group share the augmented real space. For example, the technique assumes that a plurality of users belonging to family A share virtual pet A in augmented real space A and also that a plurality of users belonging to family B share virtual pet B in augmented real space B. In this case, the technique may be used to allow all the users belonging to family A and family B to share virtual pet A and virtual pet B.

CITATION LIST

Patent Literature

PTL 1
Specification of U.S. Patent Application Publication No. 2011-0216002

SUMMARY OF INVENTION

Technical Problem

However, as mentioned above, in order for all the users belonging to different groups to share the virtual object, it is necessary for each of the users to perform the sharing procedure disclosed in PTL 1 by the number of groups desired to be shared. For that reason, in the technique disclosed in PTL 1, not only the number of operations performed by the user increases, but also it takes time for an information processing apparatus used by the user to execute processes. As a result, there is a problem in that sharing cannot be started promptly.

An object of the present invention is to make it possible to promptly start sharing when all users belonging to different groups share a virtual object of each of the groups.

Solution to Problem

An information processing apparatus according to an aspect of the present invention belongs to a group sharing an augmented real space which is constructed based on a predetermined reference point and in which a virtual object is disposed in association with a position of a real space, the information processing apparatus including: a virtual object management section that manages virtual object management information of the information processing apparatus, the virtual object management information including information on a virtual object disposed in an augmented real space shared by a group to which the information processing apparatus belongs; a communication section that receives virtual object management information of another information processing apparatus from this other information processing apparatus belonging to another group, the virtual object management information including information on a virtual object disposed in an augmented real space shared by the other group; and a reference point setting section that sets a common reference point based on the virtual object management information of the information processing apparatus and the virtual object management information of the other information processing apparatus, the common reference point being commonly used by the other group and the group to which the information processing apparatus belongs.

A server apparatus according to another aspect of the present invention is configured to communicate, through a network, with a plurality of information processing apparatuses that belong to a group sharing an augmented real space which is constructed based on a predetermined reference point and in which a virtual object is disposed in association with a position of a real space, the server apparatus including: a virtual object management section that manages first virtual object management information including information on a virtual object disposed in a first augmented real space shared by a first group to which a first information processing apparatus belongs, and second virtual object management information including information on a virtual object disposed in a second augmented real space shared by a second group to which a second information processing apparatus belongs; and a reference point setting section that sets a common reference point based on the first virtual object management information and the second virtual object management information, the common reference point being commonly used by the first group and the second group.

An information processing method according to still another aspect of the present invention is to be performed by an information processing apparatus that belongs to a group sharing an augmented real space which is constructed based on a predetermined reference point and in which a virtual object is disposed in association with a position of a real space, the information processing method including: managing virtual object management information of the information processing apparatus performing the information processing method, the virtual object management information including information on a virtual object disposed in the augmented real space shared by the group to which the information processing apparatus belongs; receiving virtual object management information of another information processing apparatus from this other information processing apparatus belonging to another group, the virtual object management information including information on a virtual object disposed in an augmented real space shared by the other group; and setting a common reference point based on the virtual object management information of the information processing apparatus and the virtual object management information of the other information processing apparatus, the common reference point being commonly used by the other group and the group to which the information processing apparatus belongs.

Advantageous Effects of Invention

According to the present invention, it is possible to promptly start sharing when all users belonging to different groups share a virtual object of each of the groups.

BRIEF DESCRIPTION OF DRAWINGS

FIG. 2A is a diagram illustrating an example of virtual object management information according to Embodiment 1 of the present invention;

FIG. 2B is a diagram illustrating an example of group management information according to Embodiment 1 of the present invention;

FIG. 2C is a diagram illustrating an example of own apparatus management information according to Embodiment 1 of the present invention;

FIG. 12A is a diagram illustrating an example of group management information according to Embodiment 4 of the present invention;

FIG. 12B is a diagram illustrating an example of shared group management information according to Embodiment 4 of the present invention;

DESCRIPTION OF EMBODIMENTS

Hereinafter, embodiments of the present invention will be described in detail with reference to the accompanying drawings.

Embodiment 1

First, a configuration of information processing apparatus 100 according to the present embodiment will be described.

<Configuration of Information Processing Apparatus>

Figure 1:
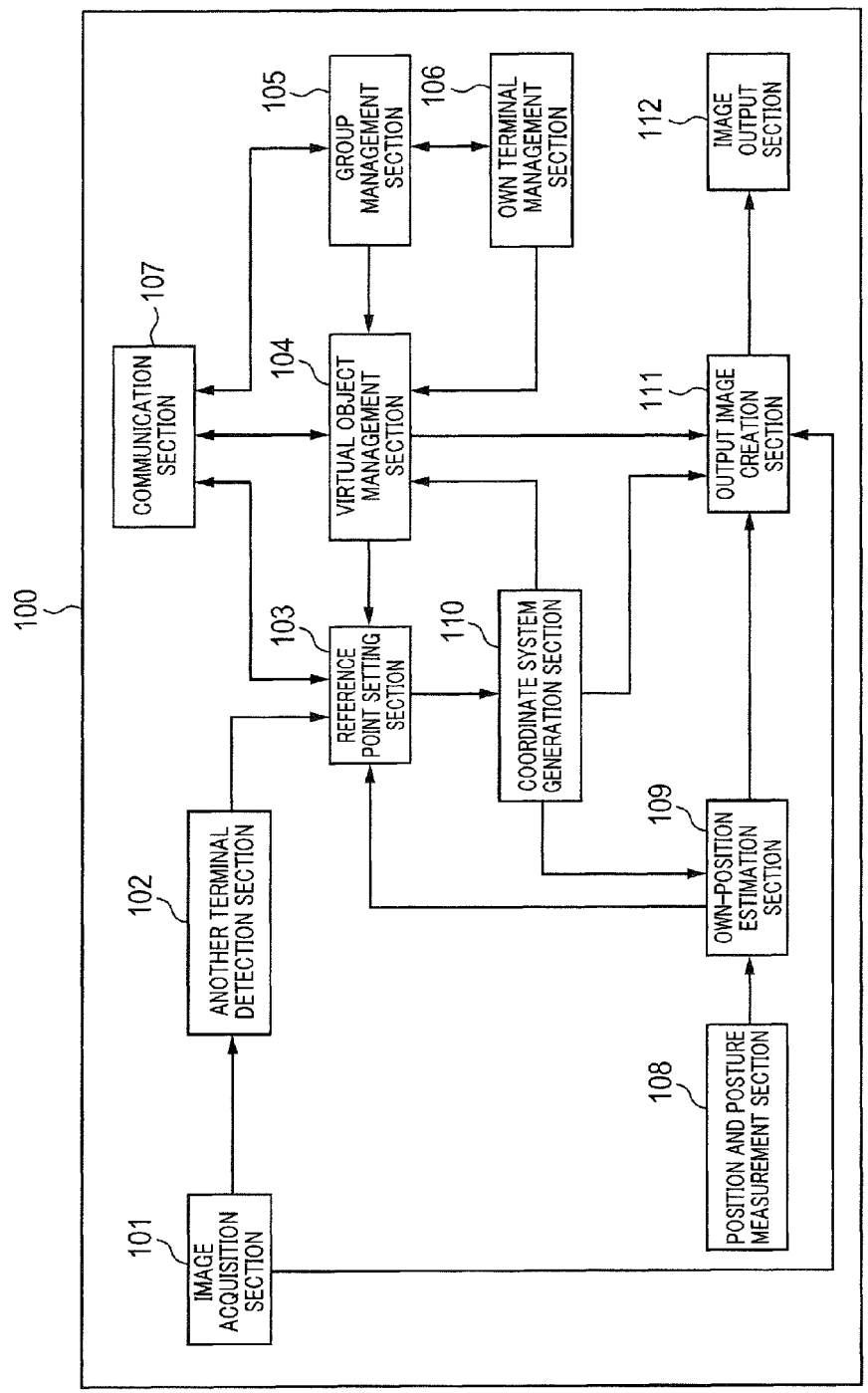
FIG. 1 is a block diagram illustrating a configuration example of an information processing apparatus according to Embodiment 1 of the present invention.

FIG. 1 is a block diagram illustrating the configuration of information processing apparatus 100 according to the present embodiment. As shown in FIG. 1, information processing apparatus 100 includes image acquisition section 101, another terminal detection section 102, reference point setting section 103, virtual object management section 104, group management section 105, own terminal management section 106, communication section 107, position and posture measurement section 108, own-position estimation section 109, coordinate system generation section 110, output image creation section 111, and image output section 112.

Image acquisition section 101 acquires an image of a real space. The image of a real space is an image of a landscape or the like captured by an image capturing apparatus such as a camera.

Another terminal detection section 102 acquires a relative position of another information processing apparatus sharing an augmented real space with respect to information processing apparatus 100 including another terminal detection section 102. Another terminal detection section 102 generates relative position information indicating the acquired relative position. A method for acquiring the above-mentioned relative position is as follows. In the method of acquiring the relative position, for example, an image of another information processing apparatus is detected from an image acquired in image acquisition section 101, and a position on a real space is specified. In addition, in the method of acquiring the relative position, a depth camera capable of measuring depth information on a real space is used as an image capturing apparatus.

Reference point setting section 103 acquires the number of virtual objects managed by each group from virtual object management section 104. Reference point setting section 103 then sets a reference point (hereinafter, referred to as a common reference point) commonly used among a plurality of groups sharing an augmented real space, on the basis of the number of virtual objects acquired. In addition, reference point setting section 103 sets the common reference point on the basis of reference point setting information acquired from another information processing apparatus through communication section 107 to be described later. In addition, reference point setting section 103 generates reference point setting information including relative position information generated by another terminal detection section 102 and apparatus position information generated by own-position estimation section 109 to be described later.

Virtual object management section 104 manages virtual object management information generated by information processing apparatus 100 and virtual object management information of another information processing apparatus acquired through communication section 107.

<Description of Virtual Object Management Information>

Here, virtual object management information will be described. FIG. 2A is a diagram illustrating an example of virtual object management information. As shown in FIG. 2A, the virtual object management information is managed in a table form, and includes, as records, virtual object ID 400, shape data 401, management apparatus ID 402, management group ID 403, and position information 404.

Virtual object ID 400 is a unique ID allocated for each virtual object. Shape data 401 is data indicating the shape of the virtual object. Management apparatus ID 402 is an ID of an information processing apparatus that has generated the virtual object. Management group ID 403 is an ID of a group to which the information processing apparatus belongs. Position information 404 is information indicating the position of the virtual object in a spatial coordinate system of an augmented real space. The spatial coordinate system is generated by coordinate system generation section 110, and is defined by an X-axis, a Y-axis, and a Z-axis.

Virtual object management section 104 executes the generation, deletion, moving and the like of the virtual object, and updates virtual object management information held in information processing apparatus 100. In addition, virtual object management section 104 shares the virtual object management information with respect to a group to which information processing apparatus 100 belongs and another information processing apparatus belonging to another group which shares an augmented real space. Virtual object management section 104 notifies another information processing apparatus belonging to a group of the updated content of the virtual object management information, on the basis of group management information to be described later, and causes another information processing apparatus to share the virtual object management information between the information processing apparatuses.

Meanwhile, the virtual object management information shown in FIG. 2A indicates a state after the augmented real space is further shared between group 200 and group 300 which share augmented real spaces different from each other in advance. Before the sharing, an information processing apparatus belonging to group 200 holds only virtual object management information a, and an information processing apparatus belonging to group 300 holds only virtual object management information b.

Group management section 105 manages group management information of a group to which information processing apparatus 100 including group management section 105 belongs and group management information of another group sharing an augmented real space. Meanwhile, group management section 105 acquires the group management information of another group through communication section 107.

<Description of Group Management Information>

Here, group management information will be described. FIG. 2B is a diagram illustrating an example of the group management information. As shown in FIG. 2B, the group management information is managed in a table form, and includes group ID 405 and information processing apparatus number 406, as records.

Group ID 405 is a unique ID allocated to each group. Information processing apparatus number 406 is the number of information processing apparatuses belonging to the group. In the example of FIG. 2B, it is indicated that the number of information processing apparatuses belonging to group 200 is three, and the number of information processing apparatuses belonging to group 300 is two.

When information processing apparatus 100 including group management section 105 newly participates in a group or leave a group, group management section 105 updates information processing apparatus number 406 of the group to which information processing apparatus 100 belongs. In addition, group management section 105 notifies the group to which information processing apparatus 100 belongs and another information processing apparatus belonging to a group which shares an augmented real space of the updated content of the group management information. Thereby, group management section 105 synchronizes the group management information between the group to which the information processing apparatus including group management section 105 belongs and the information processing apparatus belonging to the group which shares an augmented real space.

Meanwhile, the group management information shown in FIG. 2B indicates a state after an augmented real space is further shared between group 200 and group 300 which share augmented real spaces different from each other in advance. Before the sharing, the information processing apparatus belonging to group 200 holds only group management information c, and the information processing apparatus belonging to group 300 holds only group management information d.

Own terminal management section 106 manages own apparatus management information. FIG. 2C is a diagram illustrating an example of the own apparatus management information. As shown in FIG. 2C, the own apparatus management information is managed in a table form, and includes information processing apparatus ID 407 and belonging group ID 408, as records.

Information processing apparatus ID 407 is a unique ID allocated to each information processing apparatus. Belonging group ID 408 is an ID of the group to which the information processing apparatus belongs. In the example of FIG. 2C, it is indicated that information processing apparatus 211 belongs to group 200.

Communication section 107 transmits and receives the reference point setting information, the virtual object management information, and the group management information to and from another information processing apparatus.

Position and posture measurement section 108 measures a variation in the position and posture of the information processing apparatus including position and posture measurement section 108. In the measurement of the variation in the position and posture, an acceleration sensor, a magnetic sensor, a gyro sensor or the like is used. Position and posture measurement section 108 generates position and posture variation information indicating the measured variation in the position and posture.

Own-position estimation section 109 estimates a current position of the information processing apparatus including own-position estimation section 109, for a reference point, on the basis of the position and posture variation information generated in position and posture measurement section 108 and spatial coordinate system information generated in coordinate system generation section 110. Own-position estimation section 109 generates apparatus position information indicating the current position of the information processing apparatus with respect to the reference point.

Coordinate system generation section 110 generates a spatial coordinate system of an augmented real space with the origin at the set reference point, on the basis of the reference point setting information generated by reference point setting section 103. Coordinate system generation section 110 then generates spatial coordinate system information indicating the generated spatial coordinate system of the augmented real space.

Output image creation section 111 creates CG, that is, a virtual object on which superimposed display is performed, on the basis of the own apparatus position information generated in own-position estimation section 109, the spatial coordinate system information generated in coordinate system generation section 110, and the virtual object management information acquired from virtual object management section 104. Output image creation section 111 creates an image obtained by superimposing the generated virtual object on an image of a real space acquired from image acquisition section 101.

Image output section 112 outputs the image created by output image creation section 111 to a display or the like included in information processing apparatus 100.

In such information processing apparatus 100, it is possible to acquire virtual object management information and group management information of a group sharing a different augmented real space. As a result, information processing apparatus 100 can share an augmented real space and a virtual object of a different group.

As stated above, the configuration of information processing apparatus 100 according to the present embodiment has been described.

Next, an operation example when an augmented real space is further shared between a plurality of groups which share augmented real spaces different from each other in advance will be described with reference to FIGS. 3 to 8.

<Configurations of a Plurality of Groups>

First, configurations of a plurality of groups will be described with reference to FIG. 3.

Figure 3:
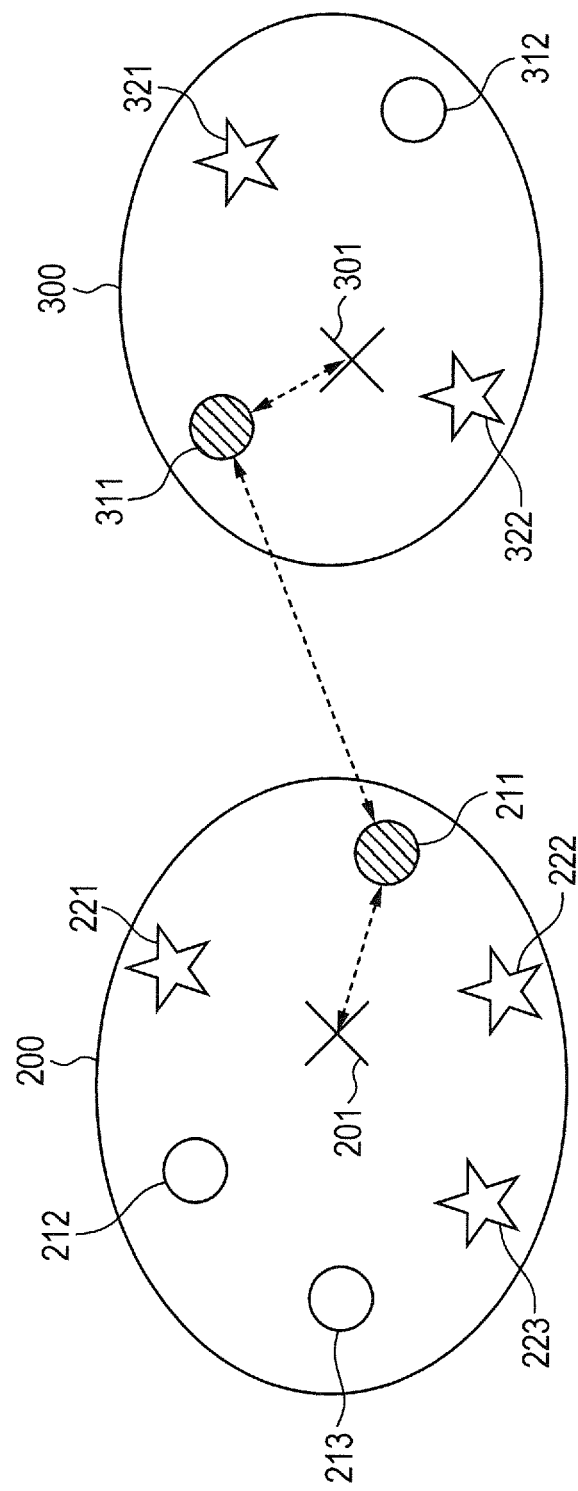
FIG. 3 is a diagram illustrating operations of the information processing apparatus according to Embodiment 1 of the present invention to share an augmented real space between two groups.

FIG. 3 is a diagram illustrating images of group 200 and group 300 which share augmented real spaces different from each other in advance.

Group 200 is formed by users sharing an augmented real space with the origin of the spatial coordinates at reference point 201. The users forming group 200 own information processing apparatuses 211, 212, and 213, respectively. These information processing apparatuses each correspond to information processing apparatus 100 mentioned above. The users of the respective information processing apparatuses share virtual objects 221, 222, and 223, respectively, in the augmented real space.

Group 300 is formed by information processing apparatuses 311 and 312 which share an augmented real space with the origin of the spatial coordinates at reference point 301. The users own information processing apparatuses 311 and 312 forming group 300, respectively. These information processing apparatuses correspond to information processing apparatus 100 mentioned above. The users share virtual objects 321 and 322, respectively, using the respective information processing apparatuses.

Meanwhile, in the example of FIG. 3, for the convenience of description, a description is given in which group 200 is provided with three information processing apparatuses and three virtual objects. In addition, a description is given in which group 300 is provided with two information processing apparatuses and two virtual objects. Meanwhile, the number of information processing apparatuses and the number of virtual objects are not limited.

The configurations of a plurality of groups have been described above.

<Description of Operation of Information Processing Apparatus>

Next, in the above-mentioned configuration of FIG. 3, the entire operation example when group 200 and group 300 further share an augmented real space will be described with reference to FIG. 4.

Figure 4:
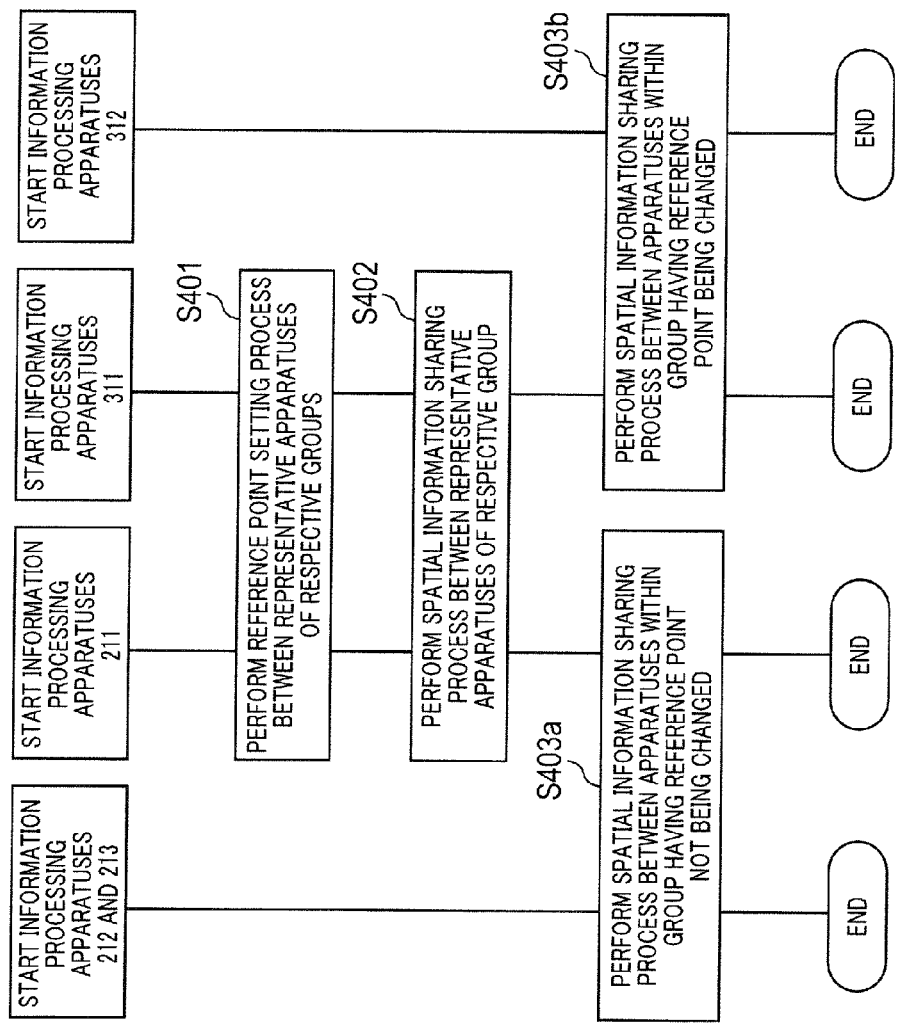
FIG. 4 is a sequence diagram illustrating processes of the information processing apparatus according to Embodiment 1 of the present invention to share the augmented real space between two groups.

FIG. 4 is a sequence diagram illustrating an operation example of each of the information processing apparatuses which belong to group 200 and group 300. Here, as an example, a user of information processing apparatus 211 and a user of information processing apparatus 311 attempt to share an additional augmented real space together.

In step S401, respective information processing apparatuses representative of group 200 and group 300 perform a reference point setting process. The reference point setting process is a process of setting a reference point which is commonly used (hereinafter, referred to as "common reference point") in both group 200 and group 300. Here, the apparatus representative of group 200 is information processing apparatus 211, and the apparatus representative of group 300 is information processing apparatus 311. Hereinafter, the apparatus representative of a group is referred to as a "representative apparatus."

Here, the common reference point is set from either reference point 201 or reference point 301. Meanwhile, further details of the reference point setting process in step S401 will be described later with reference to FIG. 5.

Meanwhile, here, the information processing apparatuses representative of group 200 and group 300 are set to information processing apparatus 211 and information processing apparatus 311, respectively, but any information processing apparatus within each of the groups may be set to the representative apparatus, without being limited to information processing apparatuses 211 and 311.

In step S402, information processing apparatus 211 and information processing apparatus 311 perform a spatial information sharing process. The spatial information sharing process is a process in which the information processing apparatuses exchange and share mutual spatial information. Each of the information processing apparatuses can share an augmented real space by the sharing of the spatial information. The spatial information is virtual object management information and group management information to be described later. Meanwhile, the spatial information sharing process performed by the representative apparatus of each of the groups is hereinafter referred to as "spatial information sharing process 1." Further spatial information sharing process 1 will be described later in detail with reference to FIG. 6.

After spatial information sharing process 1 of step S402 mentioned above, the spatial information sharing process is performed for each group. That is, in group 200 and group 300, each of the information processing apparatuses performs the spatial information sharing process. The spatial information sharing process for each group is different in content for each group, depending on which of reference point 201 or reference point 301 is set to the common reference point in step S401. Here, in step 401, reference point 201 of group 200 is assumed to be set to the common reference point. Thus, group 200 is not required to change the reference point, and group 300 is required to change the reference point. Meanwhile, a spatial information sharing process performed by a group having the reference point not being changed is hereinafter referred to as "spatial information sharing process 2." On the other hand, a spatial information sharing process performed by a group having the reference point being changed is hereinafter referred to as "spatial information sharing process 3."

In step S403a, in group 200 having the reference point being not changed, information processing apparatus 211 and the rest of information processing apparatuses 212 and 213 perform spatial information sharing process 2. Further, spatial information sharing process 2 will be described later in detail with reference to FIG. 7.

In step S403b, in group 300 having the reference point being changed, information processing apparatus 311 and the rest of information processing apparatus 312 perform spatial information sharing process 3. Further, spatial information sharing process 3 will be described later in detail with reference to FIG. 8.

In such operations shown in FIG. 4, when the augmented real space is shared among a plurality of groups, the reference points which are set for the respective groups can be used in common and be united into one. Thus, a user is not required to perform the sharing procedure disclosed in PTL 1 by the number of groups desired to be shared. Therefore, in the sharing procedure of the present embodiment, the number of operations performed by the user does not increase, and it does not take time for the information processing apparatus used by the user to perform processes either. As a result, in the present embodiment, it is possible to promptly start sharing a virtual object of each group between all the users belonging to different groups.

The entire operation example when group 200 and group 300 further share the augmented real space has been described above.

<Description of Reference Point Setting Process>

Next, the reference point setting process performed between the representative apparatuses of each group will be described in detail with reference to FIG. 5.

Figure 5:
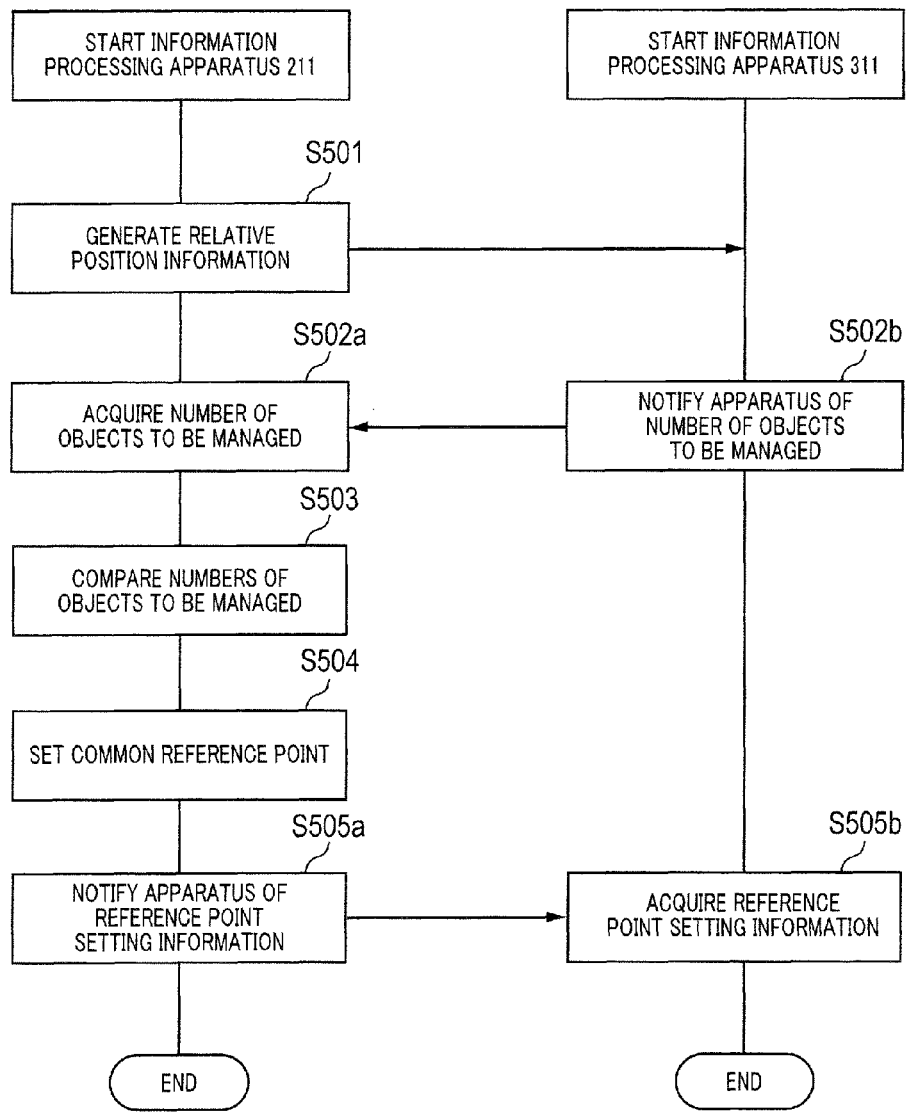
FIG. 5 is a sequence diagram illustrating processes of the information processing apparatus according to Embodiment 1 of the present invention to set a reference point commonly used between two groups.

FIG. 5 is a sequence diagram illustrating a common reference point setting process performed between information processing apparatus 211 and information processing apparatus 311.

In step S501, information processing apparatus 211 acquires a relative position of information processing apparatus 311 with respect to information processing apparatus 211, and generates relative position information indicating the relative position. In a method of acquiring the relative position, for example, a user of information processing apparatus 211 captures an image of information processing apparatus 311 using an image capturing apparatus included in information processing apparatus 211, and the relative position is acquired from the captured image.

In step S502b, information processing apparatus 311 notifies information processing apparatus 211 of the number of virtual objects to be managed in group 300 (hereinafter, referred to as the number of objects to be managed). Meanwhile, information processing apparatus 311 figures out the number of objects to be managed in group 300 from virtual object management information held therein.

In step S502a, information processing apparatus 211 acquires the number of objects to be managed from information processing apparatus 311.

In step S503, information processing apparatus 211 compares the number of objects to be managed in group 300 which is acquired in step S502a with the number of objects to be managed in group 200. Meanwhile, information processing apparatus 211 figures out the number of objects to be managed in group 200 from the virtual object management information held therein.

In step S504, as a result of the comparison in step S503, information processing apparatus 211 sets a reference point which is set in a group having the larger number of objects to be managed, as a common reference point. In the example of FIG. 3, the number of objects to be managed in group 200 is three, and the number of objects to be managed in group 300 is two. Thus, information processing apparatus 211 sets reference point 201 which is set in group 200 having the larger number of objects to be managed, as the common reference point.

In step S505a, information processing apparatus 211 generates reference point setting information regarding reference point 201 which is set to the common reference point, and notifies information processing apparatus 311 of the generated information. The reference point setting information includes the relative position information generated in step S501 and apparatus position information of information processing apparatus 211 with respect to reference point 201 (hereinafter, referred to as apparatus position information A). Meanwhile, apparatus position information A used herein is information generated in own-position estimation section 109 of information processing apparatus 211 in advance. After step S505a, information processing apparatus 211 proceeds to a flow shown in FIG. 6.

In step S505b, information processing apparatus 311 acquires the reference point setting information from information processing apparatus 211. After step S505b, information processing apparatus 311 proceeds to the flow shown in FIG. 6.

As described in FIG. 4, when the reference points are used in common and are united into one, the reference point is required to be reset depending on the group. The information processing apparatus belonging to a group required to reset the reference point has to change position information of all the virtual objects managed in the group to position information with respect to the reset reference point. Therefore, in the information processing apparatus, the processing amount for updating the position information of the virtual object increases.

Consequently, in the operations shown in FIG. 5, when the reference points which are set for the respective groups are used in common and are united into one, the numbers of objects to be managed in the groups are compared with each other, and the reference point used by the group having the larger number thereof is set as a common reference point. Thereby, in the group having the larger number of objects to be managed, the reference point is not required to be reset. In only the group having the smaller number of objects to be managed, the position information of the virtual object is changed on the basis of a newly reset reference point. As a result, the processing amount for updating the position information of the virtual object can be prevented from increasing. Meanwhile, the term "position information of the virtual object" as used herein is, for example, position information 404 shown in FIG. 2A.

Meanwhile, in the above-mentioned description of FIG. 5, the process is started from information processing apparatus 211, but the process may be started from information processing apparatus 311. In that case, the process of information processing apparatus 211 and the process of information processing apparatus 311 which are mentioned above may be replaced with each other.

In addition, in the above-mentioned description of FIG. 5, information processing apparatus 211 sets reference point 201 to the common reference point, but may set reference point 301 to the common reference point. Such a case will be described below. First, reference point setting section 103 of information processing apparatus 211 generates setting notification information including a notification indicating that reference point 301 is set as the common reference point, and transmits the generated information to information processing apparatus 311 through communication section 107. When the setting notification information is received through communication section 107, reference point setting section 103 of information processing apparatus 311 generates reference point setting information regarding reference point 301. Reference point setting section 103 of information processing apparatus 311 then transmits the reference point setting information regarding generated reference point 301 to information processing apparatus 211 through communication section 107. The reference point setting information regarding reference point 301 includes apparatus position information indicating the position of information processing apparatus 311 with respect to reference point 301. Thereafter, information processing apparatus 211 performs the same processes as steps S602 to S605 of FIG. 6 to be described later. At that time, information processing apparatus 211 uses the apparatus position information of information processing apparatus 311 with respect to reference point 301 which is included in the reference point setting information regarding reference point 301. Thereby, virtual object management section 104 of information processing apparatus 211 can update the virtual object management information held in advance, on the basis of reference point 301. Thereafter, information processing apparatus 211 performs the same process as step S801a of FIG. 8 to be described later.

The reference point setting process performed between the representative apparatuses of each group has been described above.

<Description of Spatial Information Sharing Process 1>

Next, spatial information sharing process 1 performed between the representative apparatuses of each group will be described in detail with reference to FIG. 6.

Figure 6:
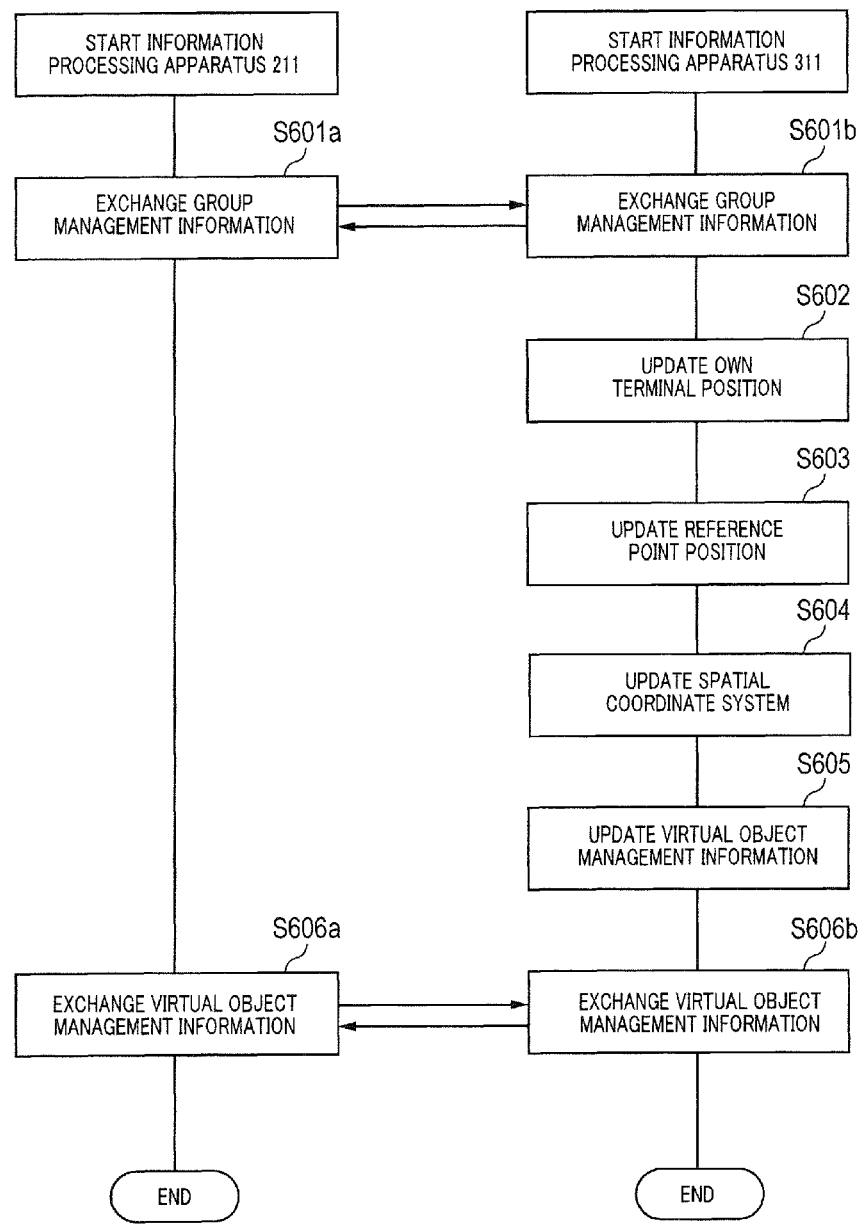
FIG. 6 is a sequence diagram illustrating processes of the information processing apparatus according to Embodiment 1 of the present invention to share spatial information.

FIG. 6 is a sequence diagram illustrating the spatial information sharing process performed between information processing apparatus 211 and information processing apparatus 311.

In step S601a, information processing apparatus 211 transmits the group management information held therein to information processing apparatus 311. The information transmitted herein is group management information c shown in FIG. 2B.

In step S601b, information processing apparatus 311 transmits the group management information held therein to information processing apparatus 211. The information transmitted herein is group management information d shown in FIG. 2B.

In this manner, information processing apparatus 211 and information processing apparatus 311 exchange the group management information of the groups to which the respective apparatuses belong. Information processing apparatus 211 and information processing apparatus 311 then add the exchanged group management information to the group management information managed in group management section 105 before the exchange. As a result, information processing apparatus 211 and information processing apparatus 311 share the group management information shown in FIG. 2B together.

In step S602, information processing apparatus 311 updates the position of information processing apparatus 311 to the coordinates with the origin at reference point 201, on the basis of the reference point setting information acquired in step S505b of FIG. 5. The reference point setting information used herein includes the relative position information and apparatus position information A, as mentioned above.

In step S603, information processing apparatus 311 updates the position of reference point 301 to the coordinates with the origin at reference point 201, on the basis of the relative position information and apparatus position information with respect to reference point 301 (hereinafter, referred to as apparatus position information B). Here, information processing apparatus 311 generates reference point position information indicating the position of reference point 301 with respect to reference point 201. The reference point position information is generated by reference point setting section 103. Meanwhile, apparatus position information B used herein is information generated in own-position estimation section 109 of information processing apparatus 311 in advance.

In step S604, information processing apparatus 311 updates the spatial coordinate system of the augmented real space used in group 300, on the basis of the generated reference point position information. That is, information processing apparatus 311 performs transformation from the spatial coordinate system with the origin at reference point 301 to the spatial coordinate system with the origin at reference point 201. The term "spatial coordinate system transformation" as used herein means a change of the direction of a space defined by an X-axis, a Y-axis, and a Z-axis from reference point 301 to reference point 201.

In step S605, information processing apparatus 311 updates the position information (position information 404 shown in FIG. 2A) of all the virtual objects to be managed in group 300 to the coordinates with the origin at reference point 201, on the basis of the generated reference point position information.

In step S606a, information processing apparatus 211 transmits the virtual object management information held in information processing apparatus 211 to information processing apparatus 311. The information transmitted herein is virtual object management information a shown in FIG. 2A.

In step S606b, information processing apparatus 311 transmits the group management information held in information processing apparatus 311 to information processing apparatus 211. The information transmitted herein is virtual object management information b shown in FIG. 2A.

In this manner, information processing apparatus 211 and information processing apparatus 311 exchange the virtual object management information regarding the virtual object managed in the groups to which the respective apparatuses belong. Information processing apparatus 211 and information processing apparatus 311 then add the exchanged virtual object management information to the respective sets of virtual object management information managed in virtual object management section 104 before the exchange. As a result, information processing apparatus 211 and information processing apparatus 311 share the virtual object management information shown in FIG. 2A together.

Figure 7:
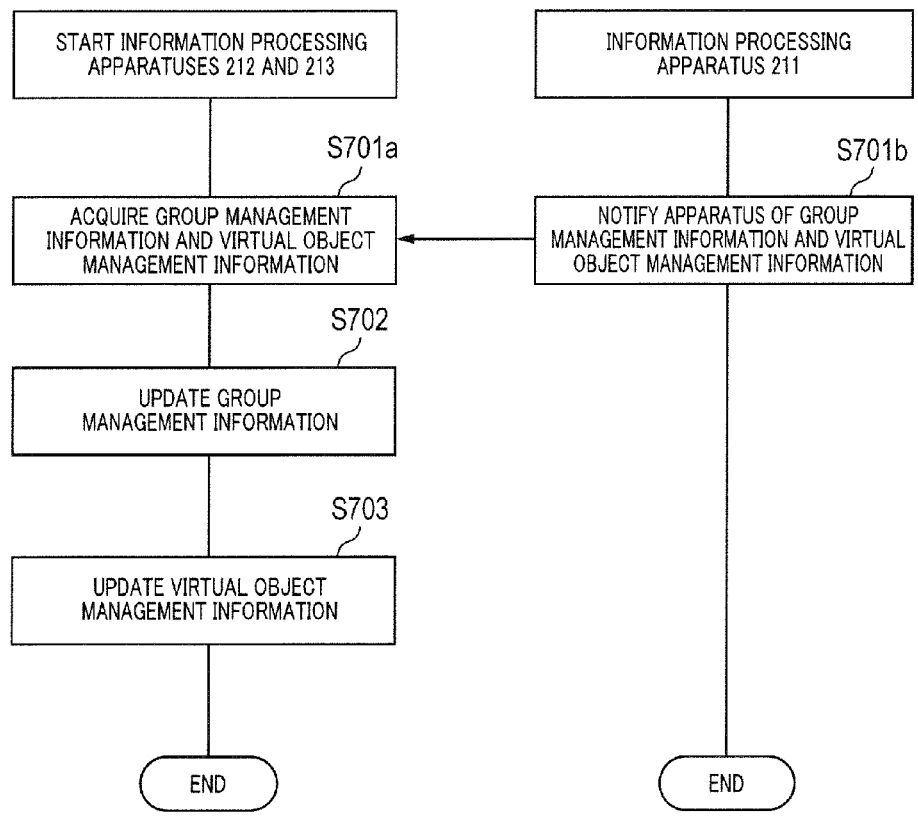
FIG. 7 is a sequence diagram illustrating processes of the information processing apparatus according to Embodiment 1 of the present invention to share the spatial information.
Figure 8:
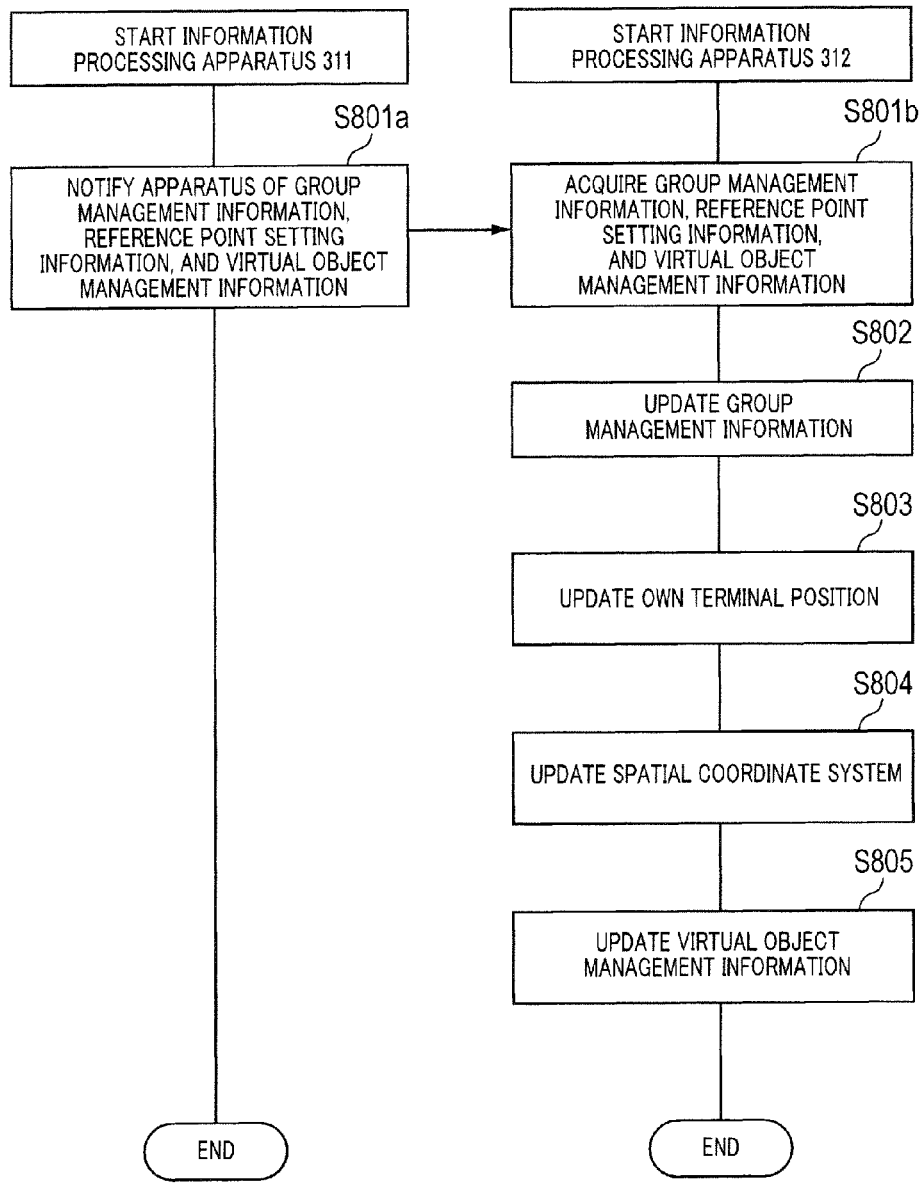
FIG. 8 is a sequence diagram illustrating processes of the information processing apparatus according to Embodiment 1 of the present invention to share the spatial information.

When such an exchange of the virtual object management information is finished, information processing apparatus 211 proceeds to a flow shown in FIG. 7, and information processing apparatus 311 proceeds to a flow shown in FIG. 8.

Meanwhile, in step S504 of FIG. 5, when reference point 301 is set as the common reference point, the process of information processing apparatus 211 and the process of information processing apparatus 311 may be replaced with each other in FIG. 6.

With that, the description of further details of spatial information sharing process 1 performed between the representative apparatuses of each group is finished.

<Description of Spatial Information Sharing Process 2>

Next, further details of spatial information sharing process 2 performed in group 200 having the reference point not being changed will be described with reference to FIG. 7.

FIG. 7 is a sequence diagram illustrating a spatial information sharing process performed between information processing apparatus 211 and information processing apparatuses 212 and 213. Here, as an example, the process between information processing apparatus 211 and information processing apparatus 212 will be described, but the same is true of the processing content between information processing apparatuses 211 and 213.

In step S701b, information processing apparatus 211 notifies information processing apparatus 212 of the group management information and the management information of the virtual object in which update is completed by the exchange of information with information processing apparatus 311. The information which is notified of herein is the virtual object management information shown in FIG. 2A and the group management information shown in FIG. 2B.

In step S701a, information processing apparatus 212 acquires the group management information and the management information of the virtual object from information processing apparatus 211.

In step S702, information processing apparatus 212 updates the group management information managed in group management section 105 to the group management information acquired in step S701a. Thereby, information processing apparatus 212 shares the same group management information as the group management information held in information processing apparatus 211.

In step S703, information processing apparatus 212 updates the virtual object management information managed in virtual object management section 104 to the virtual object management information acquired in step S701a (step S703). Thereby, information processing apparatus 212 shares the same virtual object management information as the virtual object management information held in information processing apparatus 211.

When the flow of FIG. 7 is terminated, each of the information processing apparatuses belonging to group 200 terminates a series of processes continuous from FIG. 5. That is, information processing apparatuses 211, 212, and 213 belonging to group 200 start sharing spatial information managed by each of the information processing apparatuses of group 300. Thereby, information processing apparatuses 211, 212, and 213 start sharing the augmented real space and the virtual object which are shared in group 300 in advance. As a result, each of the users of information processing apparatuses 211, 212, and 213 can visually recognize both the augmented real space and the virtual object, which are shared in group 200 and group 300 in advance, through the respective information processing apparatuses.

Further details of spatial information sharing process 2 performed in group 200 having the reference point being not changed has been described above.

<Description of Spatial Information Sharing Process 3>

Next, further details of spatial information sharing process 3 performed in group 300 having the reference point being changed will be described with reference to FIG. 8.

FIG. 8 is a sequence diagram illustrating a spatial information sharing process performed between information processing apparatus 311 and information processing apparatus 312.

In step S801a, information processing apparatus 311 notifies information processing apparatus 312 of the group management information and the management information of the virtual object in which update is completed by the exchange of information with information processing apparatus 211. Further, information processing apparatus 311 notifies information processing apparatus 312 of the reference point setting information acquired from information processing apparatus 211. The information which is notified of herein is the virtual object management information shown in FIG. 2A and the group management information shown in FIG. 2B. In addition, the reference point setting information which is notified of herein also includes the reference point position information of reference point 301 with respect to reference point 201 which is set in step S603 of FIG. 6, in addition to the relative position information and apparatus position information A.

In step S801b, information processing apparatus 312 acquires the group management information, the management information of the virtual object and the reference point setting information from information processing apparatus 311.

In step S802, information processing apparatus 312 updates the group management information managed in group management section 105 to the group management information acquired in step S801a. Thereby, information processing apparatus 312 shares the same group management information as the group management information held in information processing apparatus 311.

In step S803, information processing apparatus 312 acquires the reference point position information included in the reference point setting information acquired in step S801a and apparatus position information of information processing apparatus 312 with respect to reference point 301 (hereinafter, referred to as apparatus position information C). Information processing apparatus 312 updates the position of information processing apparatus 312 to the coordinates with the origin at reference point 201, on the basis of the acquired reference point position information and apparatus position information C. Meanwhile, apparatus position information C used herein is generated in own-position estimation section 109 of information processing apparatus 312.

In step S804, information processing apparatus 312 updates the spatial coordinate system of the augmented real space, on the basis of the reference point position information included in the reference point setting information acquired in step S801a. That is, information processing apparatus 312 transforms the spatial coordinate system of the augmented real space used in group 300 from the spatial coordinate system with the origin at reference point 301 to the spatial coordinate system with the origin at reference point 201. This exchange is the same process as step S604 of FIG. 6 mentioned above.

In step S805, information processing apparatus 312 updates the virtual object management information managed in virtual object management section 104 to the virtual object management information acquired in step S801a. Thereby, information processing apparatus 312 shares the same virtual object management information as the virtual object management information held in information processing apparatus 311.

When the flow of FIG. 8 is terminated, each of the information processing apparatuses belonging to group 300 terminates a series of processes continuous from FIG. 5. That is, information processing apparatuses 311 and 312 belonging to group 300 start sharing spatial information managed by each of the information processing apparatuses of group 200. Thereby, information processing apparatuses 311 and 312 start sharing the augmented real space and the virtual object which are shared in group 200 in advance. As a result, each of the users of information processing apparatuses 311 and 312 can visually recognize both the augmented real space and the virtual object, which are shared in group 300 and group 200 in advance, through the respective information processing apparatuses.

Further details of spatial information sharing process 3 performed in group 300 having the reference point being changed have been described above.

When the creation, deletion, moving or the like of the virtual object is newly performed after the flows of FIGS. 7 and 8, the information processing apparatus belonging to group 200 or group 300 first updates the virtual object management information held in the information processing apparatus. Next, information processing apparatus refers to the group management information, and specifies a group ID recorded as a sharing relationship. Information processing apparatus notifies the information processing apparatus belonging to the group indicated by the specified group ID of the updated content of the virtual object management information. On the other hand, the information processing apparatus having received the notification updates the virtual object management information managed in virtual object management section 104 of the information processing apparatus, on the basis of the updated content which is notified of.

In this manner, when the information processing apparatus of the present embodiment shares the augmented real space among a plurality of groups, the reference points which are set for the respective groups can be used in common and be united into one. Thus, a user is not required to perform the sharing procedure disclosed in PTL 1 by the number of groups desired to be shared. Therefore, in the sharing procedure of the present embodiment, the number of operations performed by the user does not increase, and it does not also take time for the information processing apparatus used by the user to perform processes either. As a result, in the present embodiment, it is possible to promptly start sharing a virtual object of each group among all the users belonging to different groups.

In addition, the information processing apparatus of the present embodiment compares the numbers of virtual objects managed by two groups sharing the augmented real space, that is, the numbers of objects to be managed by the two groups. As a result of comparison, the information processing apparatus sets a reference point used in the group having the larger number of objects to be managed, as a common reference point commonly used in the two groups. Thus, in the information processing apparatus of the present embodiment, the group having the smaller number of objects to be managed changes the reference point. Thereby, in the information processing apparatus of the present embodiment, only the information processing apparatus belonging to the group having the smaller number of objects to be managed performs a process of changing position information of the virtual object on the basis of the changed reference point. On the other hand, the group having the larger number of objects to be managed is not required to change the reference point. Thus, the information processing apparatus belonging to the group having the larger number of objects to be managed does not perform the process of changing the position information of the virtual object. Therefore, in the present embodiment, it is possible to suppress the processing amount for updating the position information of the virtual object associated with a change in the reference point.

Embodiment 2

In Embodiment 1, the operations when single groups not sharing the augmented real space with another group in advance share the augmented real space have been described. In the present embodiment, operations when the groups sharing the augmented real space with another group in advance share the augmented real space will be described.

<Description of Configurations of a Plurality of Groups>

First, configurations of a plurality of groups will be described with reference to FIG. 9.

Figure 9:
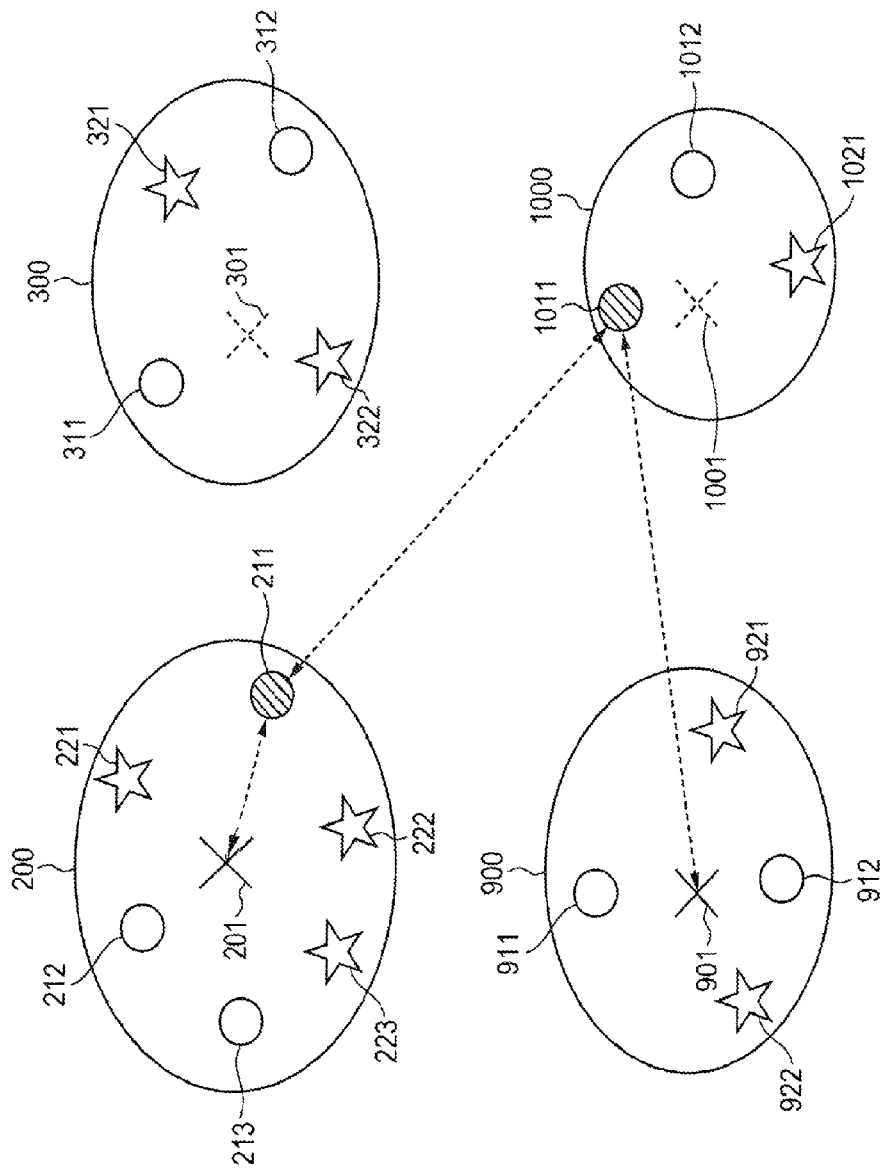
FIG. 9 is a diagram illustrating operations of an information processing apparatus according to Embodiment 2 of the present invention.

FIG. 9 is a diagram illustrating images of group 200, group 300, group 900, and group 1000 which share augmented real spaces different from each other in advance. In FIG. 9, portions in common with those in FIG. 3 are assigned the same reference numerals and signs as those in FIG. 3, and the description thereof will be omitted.

As shown in FIG. 9, in the present embodiment, group 900 and group 1000 are present in addition to group 200 and group 300 described in Embodiment 1. Group 200 and group 300 herein share the augmented real space in which the reference point 201 is set to the common reference point, as a result of the operations described in Embodiment 1. In addition, in the present embodiment, group 900 and group 1000 also share the augmented real space in which reference point 901 is set to the common reference point, as a result of the operations described in Embodiment 1.

Group 900 is formed by users sharing the augmented real space with the origin of the spatial coordinates at reference point 901. The users forming group 900 own information processing apparatuses 911 and 912, respectively. These information processing apparatuses correspond to information processing apparatus 100 described in Embodiment 1. The respective users manage virtual objects 921 and 922 in the augmented real space, using the respective information processing apparatuses.

Group 1000 is formed by users sharing the augmented real space with the origin of the spatial coordinates at reference point 1001 before the augmented real space is shared with group 900. The users forming group 1000 own information processing apparatuses 1011 and 1012, respectively. These information processing apparatuses correspond to information processing apparatus 100 described in Embodiment 1. The respective users manage virtual object 1021 in the augmented real space, using the respective information processing apparatuses.

Meanwhile, for the convenience of description, a description is given in which the group 900 is provided with two information processing apparatuses and two virtual objects. In addition, a description is given in which group 1000 is provided with two information processing apparatuses and one virtual object. However, the number of information processing apparatuses and the number of virtual objects are not limited. In addition, in FIG. 9, the respective groups share the augmented real space one by one with another group. However, the number of groups sharing the augmented real space in each of the groups is not limited.

The configurations of a plurality of groups have been described above.

Next, in the above-mentioned configurations of FIG. 9, an operation example when group 200, group 300, group 900, and group 1000 share the augmented real space will be described. The operation example is almost the same as the operation performed between two groups described in Embodiment 1. Thus, points different from those in Embodiment 1 will be described below with reference to FIGS. 4 to 8.

<Description of the Entire Operation>

First, the entire operation example of the present embodiment will be described with reference to FIG. 4.

Steps S401 and S402 are performed between an information processing apparatus representative of both group 200 and group 300 and an information processing apparatus representative of both group 900 and group 1000. Here, the representative apparatus of group 200 and group 300 is set to information processing apparatus 211. In addition, the representative apparatus of group 900 and group 1000 is set to information processing apparatus 1011. Thus, information processing apparatus 211 and information processing apparatus 1011 perform steps S401 and S402. Meanwhile, hereinafter, for the convenience of description, group 200 and group 300 which have a sharing relationship in advance are referred to as "group X having a sharing relationship" collectively. In addition, group 900 and group 1000 which have a sharing relationship in advance are referred to as "group Y having a sharing relationship" collectively.

Step S403a and step S403b are performed between the representative apparatus and all the information processing apparatuses other than the representative apparatus, for each group having a sharing relationship. That is, in group X having a sharing relationship, step S403a or step S403b is performed between information processing apparatus 211 which is a representative apparatus and the rest of information processing apparatuses 212, 213, 311, and 312. In addition, in group Y having a sharing relationship, step S403a or step S403b is performed between information processing apparatus 1011 which is a representative apparatus and the rest of information processing apparatuses 1012, 911, and 912.

<Description of Reference Point Setting Process>

Next, further details of the reference point setting process performed between the representative apparatuses of each group will be described with reference to FIG. 5.

In FIG. 5, each of the steps of information processing apparatus 311 described in Embodiment 1 is equivalent to each of the steps of information processing apparatus 1011 in the present embodiment.

In step S502a, information processing apparatus 211 acquires the number of objects to be managed in group Y having a sharing relationship from information processing apparatus 1011.

In step S503, information processing apparatus 211 compares the number of objects to be managed in group Y having a sharing relationship acquired in step S502a with the number of objects to be managed in group X having a sharing relationship. Meanwhile, information processing apparatus 211 can figure out the number of objects to be managed in group X having a sharing relationship from the virtual object management information managed in virtual object management section 104 of information processing apparatus 211.

In step S504, information processing apparatus 211 sets a common reference point commonly used in group 200, group 300, group 900, and group 1000, on the basis of the comparison result of the numbers of objects to be managed. That is, information processing apparatus 211 sets the reference point, used in the group having the larger number of objects to be managed, to the common reference point. Here, as shown in FIG. 9, the number of objects to be managed in group X having a sharing relationship is five, whereas the number of objects to be managed in group Y having a sharing relationship is three. Thus, information processing apparatus 211 sets reference point 201 commonly used in group X having a sharing relationship to the common reference point. Thus, group X having a sharing relationship does not change the reference point, but group Y having a sharing relationship changes the reference point.

In this manner, in the present embodiment, as is the case with the above-mentioned embodiment, the numbers of objects to be managed in the groups having a sharing relationship are compared with each other, and the common reference point used in all the groups is set on the basis of the comparison result.

In step S505a, information processing apparatus 211 generates reference point setting information on reference point 201 which is a common reference point, and notifies information processing apparatus 1011 of the generated information. The reference point setting information which is notified of herein is the same as the content described in Embodiment 1.

After step S505a and step S505b, information processing apparatus 211 and information processing apparatus 1011 proceed to the flow shown in FIG. 6.

<Description of Spatial Information Sharing Process 1>

Next, further details of spatial information sharing process 1 performed between the representative apparatuses of each group will be described with reference to FIG. 6.

In FIG. 6, each of the steps of information processing apparatus 311 described in Embodiment 1 is equivalent to each of the steps of information processing apparatus 1011 in the present embodiment.

In step S601a, information processing apparatus 211 transmits the group management information held therein to information processing apparatus 1011. As shown in FIG. 2B, the information transmitted herein is group management information on group X having a sharing relationship.

In step S601b, information processing apparatus 1011 transmits the group management information held therein to information processing apparatus 211. The information transmitted herein is group management information on group Y having a sharing relationship.

In this manner, the representative apparatuses of the respective groups having a sharing relationship exchange the group management information held in the respective apparatuses with each other. Information processing apparatus 211 and information processing apparatus 1011 add the exchanged group management information to the respective sets of group management information managed in group management section 105 before the exchange. As a result, information processing apparatus 211 and information processing apparatus 1011 share the same group management information.

In step S606a, information processing apparatus 211 transmits the virtual object management information held in information processing apparatus 211 to information processing apparatus 1011. As shown in FIG. 2A, the information transmitted herein is virtual object management information on group X having a sharing relationship.

In step S606b, information processing apparatus 1011 transmits the group management information held therein to information processing apparatus 211. The information transmitted herein is virtual object management information on group Y having a sharing relationship.

In this manner, the representative apparatuses of the respective groups having a sharing relationship exchange the virtual object management information held in the respective apparatuses with each other. Information processing apparatus 211 and information processing apparatus 1011 add the exchanged virtual object management information to the respective sets of virtual object management information managed in virtual object management section 104 before the exchange. As a result, information processing apparatus 211 and information processing apparatus 1011 share the same virtual object management information.

After step S606a and step S606b, information processing apparatus 211 proceeds to the flow shown in FIG. 7, and information processing apparatus 1011 proceeds to the flow shown in FIG. 8.

In group X having a sharing relationship which has the reference point being not changed, information processing apparatus 211 performs spatial information sharing process 2. In FIG. 7, each of the steps of information processing apparatuses 212 and 213 described in Embodiment 1 is equivalent to each of the steps of information processing apparatuses 212, 213, 311, and 312 in the present embodiment.

In group Y having a sharing relationship which changes the reference point, information processing apparatus 1011 performs spatial information sharing process 3. In FIG. 8, each of the steps of information processing apparatus 311 described in Embodiment 1 is equivalent to each of the steps of information processing apparatus 1011 in the present embodiment. In addition, in FIG. 8, each of the steps of information processing apparatus 312 is equivalent to each of the steps of information processing apparatuses 911, 912, and 1012 in the present embodiment.

The sharing process of the augmented real space between group 200, group 300, group 900, and group 1000 is completed as described above.

In this manner, in the present embodiment, even when the groups having a sharing relationship which share the augmented real space with another group in advance perform the sharing of the augmented real space, the groups operate as is the case with Embodiment 1. That is, when the information processing apparatus shares the augmented real space between a plurality of groups, the reference points which are set for the respective groups can be used in common and be united into one. Thus, a user is not required to perform the sharing procedure disclosed in PTL 1 by the number of groups desired to be shared. Therefore, in the sharing procedure of the present embodiment, the number of operations performed by the user does not increase, and it does not take time for the information processing apparatus used by the user to perform processes either. As a result, in the present embodiment, it is possible to promptly start sharing a virtual object of each group among all the users belonging to different groups.

In addition, the information processing apparatus compares the numbers of objects to be managed in the groups having a sharing relationship, and the reference point used by the group having a sharing relationship which has the large number of objects is set as the common reference point used in all the groups. Thus, in the present embodiment, the group having a sharing relationship which has the small number of objects to be managed changes the reference point. Thereby, in the present embodiment, only the information processing apparatus belonging to the group having a sharing relationship which has the small number of objects to be managed performs a process of changing position information of the virtual object, on the basis of the changed reference point. On the other hand, the group having a sharing relationship which has the large number of objects to be managed is not required to change the reference point. Thus, the information processing apparatus belonging to the group having a sharing relationship which has the large number of objects to be managed does not perform the process of changing the position information of the virtual object. Therefore, in the present embodiment, it is possible to suppress the processing amount for updating the position information of the virtual object associated with a change in the reference point.

In addition, when the information processing apparatus belonging to a predetermined group attempts to share the augmented real space with respect to the group having a sharing relationship, a user has to perform an operation for acquiring a relative position by the number of groups constituting the group having a sharing relationship. This operation is, for example, an operation for capturing an image of the representative apparatus of each group. In the present embodiment, a user may perform an operation for acquiring a relative position with respect to only one information processing apparatus belonging to a group desiring to share the augmented real space. Thereby, in the present embodiment, it is possible to share the augmented real space with a plurality of groups constituting the group having a sharing relationship all at once, and to reduce the number of user's operations.

Embodiment 3

In Embodiments 1 and 2, the process in which a plurality of groups share the augmented real space has been described, but it is assumed that after such sharing of the augmented real space, there may be a group terminating the sharing. In the present embodiment, operations when the sharing of the augmented real space is terminated will be described below.

In the present embodiment, a process for terminating the sharing of the augmented real space (hereinafter, referred to as a sharing termination process) will be described with reference to FIGS. 9 and 10. In the present embodiment, for example, as a result of Embodiment 2, group 200, group 300, group 900, and group 1000 are assumed to use reference point 201 as the common reference point. Group 200 is assumed to terminate the sharing of the augmented real space with group 300, group 900, and group 1000. On the other hand, group 300, group 900, and group 1000 are assumed to share the augmented real space continuously.

Figure 10:
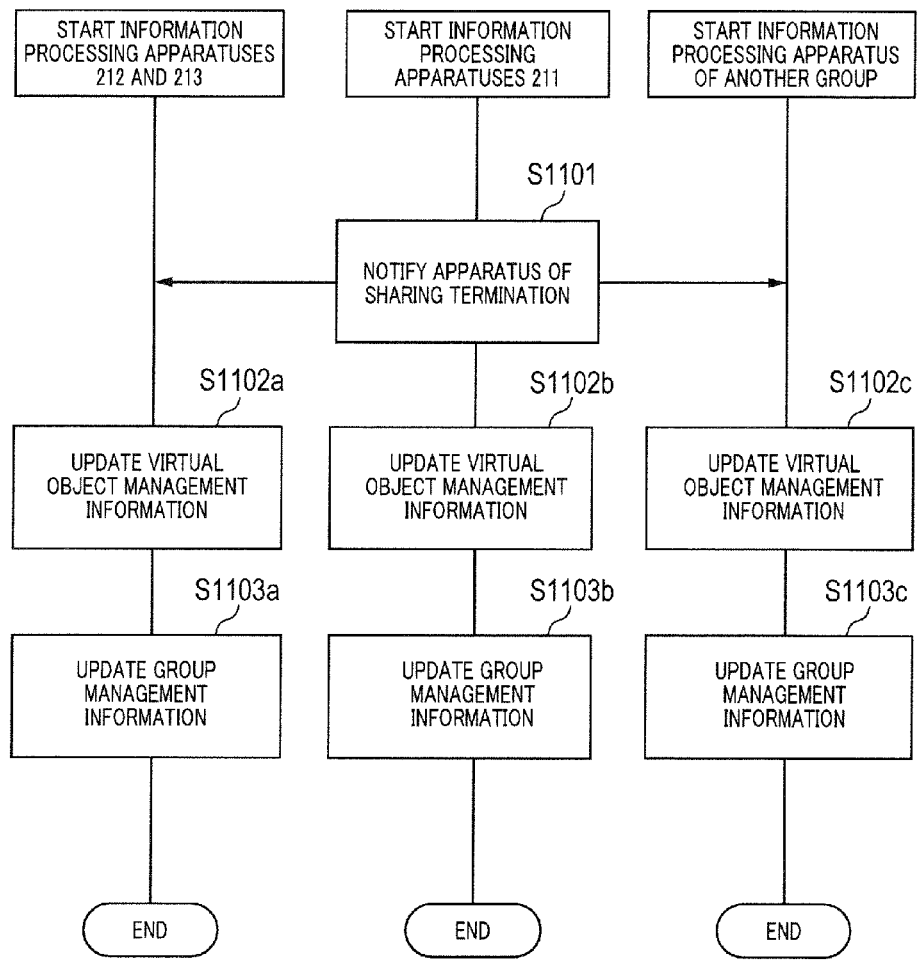
FIG. 10 is a sequence diagram illustrating processes of the information processing apparatuses according to Embodiments 1 and 2 of the present invention to terminate the sharing of the augmented real space.

FIG. 10 is a sequence diagram illustrating a process of each information processing apparatus belonging to group 200, group 300, group 900, and group 1000 when group 200 terminates the sharing of the augmented real space with another group. Here, information processing apparatus 211 is assumed to perform the sharing termination process on behalf of group 200.

In step S1101, information processing apparatus 211 notifies all the information processing apparatuses belonging to group 200, group 300, group 900, and group 1000 that group 200 terminates the sharing.

In step S1102a, when a sharing termination notification is received from information processing apparatus 211, information processing apparatuses 212 and 213 update the virtual object management information. That is, information processing apparatuses 212 and 213 delete the virtual object management information indicating that the management group ID is other than group 200, from the virtual object management information managed in virtual object management section 104.

In step S1102b, when the sharing termination notification is transmitted to information processing apparatuses 212 and 213, information processing apparatus 211 updates the virtual object management information. That is, information processing apparatus 211 deletes the virtual object management information indicating that the management group ID is other than group 200, from the virtual object management information managed in virtual object management section 104.

In step S1102c, when the sharing termination notification is received from information processing apparatus 211, each of the information processing apparatuses belonging to the groups other than group 200 updates the virtual object management information. That is, each of the information processing apparatuses deletes the virtual object management information indicating that the management group ID is group 200, from the virtual object management information managed in virtual object management section 104.

In step S1103a, information processing apparatuses 212 and 213 update the group management information. That is, information processing apparatuses 212 and 213 delete the group management information indicating that the group ID is groups 300, 900, and 1000, from the group management information managed in group management section 105.

In step S1103*b*, information processing apparatus 211 also deletes the group management information indicating the group ID is groups 300, 900, and 1000, from the group management information managed in group management section 105.

In step S1103*c*, each of the information processing apparatuses belonging to the groups other than group 200 updates the group management information. That is, each of the information processing apparatuses deletes the group management information indicating the group ID is group 200, from the group management information managed in group management section 105.

The sharing termination process of group 200 is completed in the manner described above. Thereby, each of the information processing apparatuses belonging to group 200 terminates the sharing of spatial information of group 300, group 900, and group 1000. Thus, each of the information processing apparatuses belonging to group 200 terminates the sharing of the augmented real space shared in group 300, group 900, and group 1000 in advance and the virtual object. As a result, the users of each of the information processing apparatuses belonging to group 200 cannot visually recognize the augmented real space shared in group 300, group 900, and group 1000 in advance and the virtual object through the information processing apparatuses. Similarly, each of the information processing apparatuses belonging to group 300, group 900, and group 1000 terminates the sharing of the spatial information of group 200. Thus, each of the information processing apparatuses belonging to group 300, group 900, and group 1000 terminates the sharing of the augmented real space shared in group 200 in advance and the virtual object. As a result, the users of each of the information processing apparatuses belonging to group 300, group 900, and group 1000 cannot visually recognize the augmented real space shared in group 200 in advance and the virtual object through the information processing apparatuses.

In the present embodiment, each of the information processing apparatuses manages the position information of the common reference point, independently of the group management information and the virtual object management information. Thus, after the above-mentioned sharing termination process of group 200, the information processing apparatus belonging to group 200 can use reference point 201 as the common reference point. In addition, similarly, the information processing apparatuses belonging to group 300, group 900, and group 1000 can continue to use reference point 201 as the common reference point of group 300, group 900, and group 1000. Therefore, in the present embodiment, it is no longer required to perform a process for setting the common reference point again because of the sharing termination process of the group, or an update process of position information of the virtual object managed by each group, involved with the process of setting the common reference point. As a result, in the present embodiment, it is possible to suppress the processing amount of each of the information processing apparatuses at the time of the sharing termination of the group.

Meanwhile, in the description above, the information processing apparatuses belonging to group 200 perform the sharing termination processes all at once, but the information processing apparatuses belonging to group 200 may perform the sharing termination process individually. For example, when information processing apparatus 211 terminates the sharing alone, information processing apparatuses 212 and 213 having received the sharing termination notification delete the virtual object management information indicating that the management apparatus ID is information processing apparatus 211, in step S1102*a*. Subsequently, information processing apparatuses 212 and 213 update the information processing apparatus number of group 200 in step S1103*a*. In addition, each of the information processing apparatuses belonging to the groups other than group 200 which have received the sharing termination notification deletes the virtual object management information indicating that the management apparatus ID is information processing apparatus 211, in step S1102*c*. Subsequently, each of the information processing apparatuses belonging to the groups other than group 200 updates the information processing apparatus number of group 200 in step S1103*c*. As a result of the update, when the information processing apparatus number of group 200 becomes zero, each of the information processing apparatuses deletes the group ID of group 200 from the group management information.

Embodiment 4

In Embodiments 1, 2, and 3, a description has been given in which all the processes are performed in each of the information processing apparatuses, but some of the processes of the information processing apparatuses in each of the embodiments may be executed by a server connected through a network. In the present embodiment, a description will be given of operations when the same sharing procedure as that in Embodiment 1 is realized using the information processing apparatus and a server connected through a network.

<Configuration of Information Processing Apparatus>

First, the configurations of information processing apparatus 100A and server 1300 according to the present embodiment will be described. Information processing apparatus 100A and server 1300 are connected to each other through a network such as, for example, the Internet or a LAN (Local Area Network).

Figure 11:
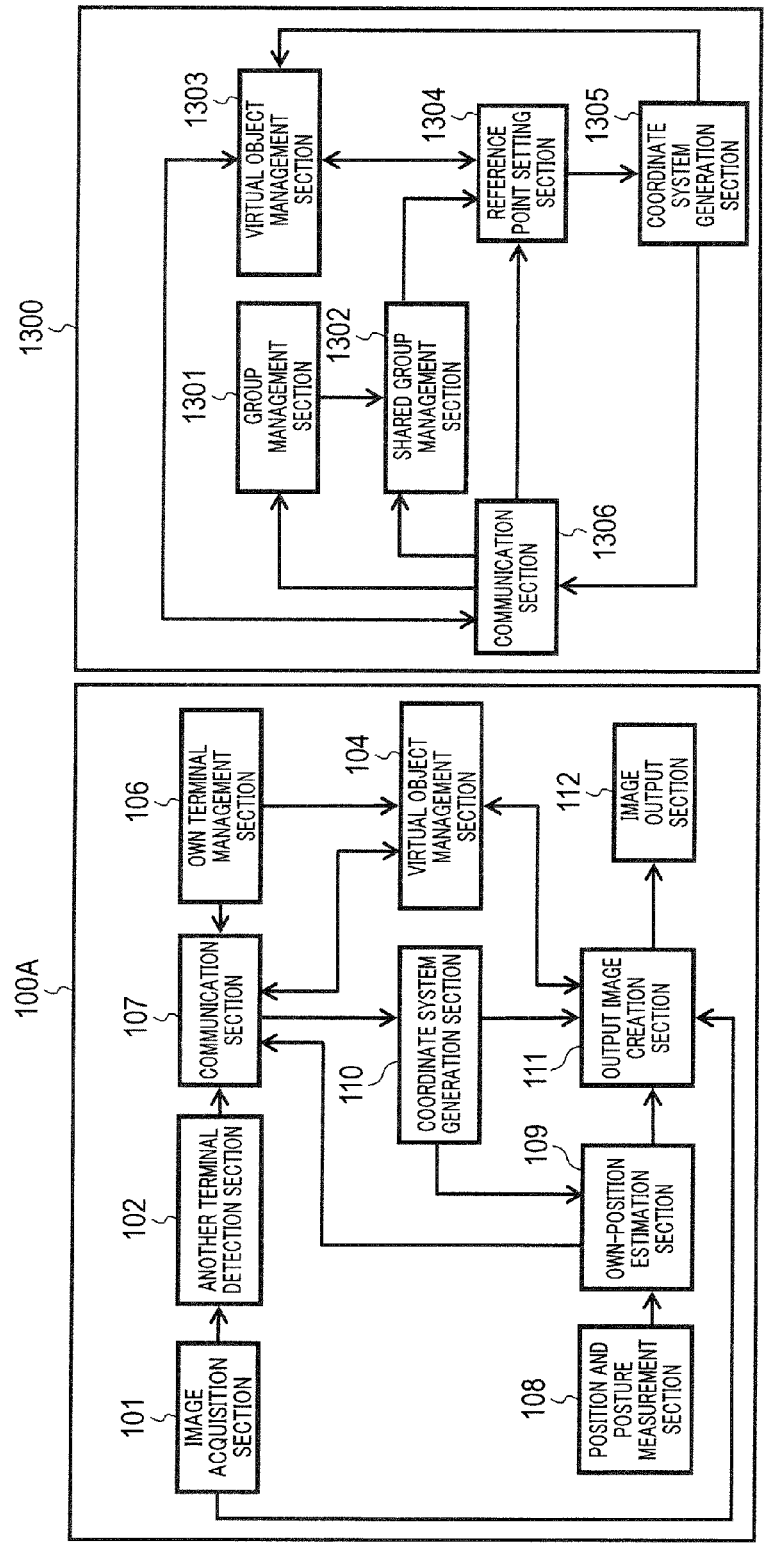
FIG. 11 is a block diagram illustrating a configuration example of an information processing apparatus and a server apparatus according to Embodiment 4 of the present invention.

FIG. 11 is a block diagram illustrating the configurations of information processing apparatus 100A and server 1300. Meanwhile, in FIG. 11, components in common with those in FIG. 1 are assigned the same reference numerals and signs as those in FIG. 1, and the description of components except for those having some changes in processing content will be omitted.

Information processing apparatus 100A includes image acquisition section 101, another terminal detection section 102, virtual object management section 104, own terminal management section 106, communication section 107, position and posture measurement section 108, own-position estimation section 109, coordinate system generation section 110, output image creation section 111, and image output section 112.

Communication section 107 transmits and receives, to and from server 1300, the relative position information generated by another terminal detection section 102, the apparatus position information generated by own-position estimation section 109, the virtual object management information, the group management information, and spatial coordinate system update information to be described later.

Coordinate system generation section 110 generates a spatial coordinate system of the augmented real space on the basis of the spatial coordinate system update information which is notified of from server 1300 through communication section 107. Coordinate system generation section 110 then generates spatial coordinate system information indicating the generated spatial coordinate system of the augmented real space.

The configuration of information processing apparatus 100A according to the present embodiment has been described above.

Next, the configuration of server 1300 will be described.

<Configuration of Server>

Server 1300 includes group management section 1301, shared group management section 1302, virtual object management section 1303, reference point setting section 1304, coordinate system generation section 1305, and communication section 1306.

Group management section 1301 manages information on the groups to which all the information processing apparatuses connected to server 1300 belong (hereinafter, referred to as "group management information"). FIG. 12A is a diagram illustrating an example of the group management information managed by group management section 1301.

As shown in FIG. 12A, the group management information is managed in a table form, and includes information processing apparatus ID 409 and belonging group ID 410 as a record. Information processing apparatus ID 409 is a unique ID allocated to each information processing apparatus. The term, "belonging group ID" is an ID of the group to which the information processing apparatus belongs. In the example of FIG. 12A, it is indicated that information processing apparatuses 211, 212, and 213 belong to group 200, and information processing apparatuses 311 and 312 belong to group 300.

When an information processing apparatus is newly connected to server 1300, group management section 1301 adds its information processing apparatus ID and belonging group ID to the group management information. In addition, when the sharing termination is notified by the information processing apparatus connected to server 1300, group management section 1301 deletes its information processing apparatus ID and belonging group ID from the group management information.

Shared group management section 1302 manages information on the sharing relationship of the virtual object (hereinafter, referred to as shared group management information) between the groups to which the information processing apparatuses connected to server 1300 belong. FIG. 12B is a diagram illustrating an example of the shared group management information managed by shared group management section 1302.

As shown in FIG. 12B, the shared group management information is managed in a table form, and includes group ID 411 and shared group ID 412 as a record. Group ID 411 is an ID of the group to which each of the information processing apparatuses connected to server 1300 belongs. Shared group ID 412 is an ID of the group which is in a relationship of sharing the virtual object. In the example of FIG. 12B, it is indicated that group 200 and group 300 have a sharing relationship.

Meanwhile, the shared group management information shown in FIG. 12B indicates a state after an augmented real space is further shared between group 200 and group 300 which share augmented real spaces different from each other in advance. Before the sharing, neither the shared group ID of the record indicating that the group ID is 200 nor the shared group ID of the record indicating that the group ID is 300 is set.

Virtual object management section 1303 manages information on the virtual object generated by all the information processing apparatuses connected to the server, that is, virtual object management information. The management information of the virtual object managed in virtual object management section 1303 is, for example, the same as that shown in FIG. 2A.

When each of the information processing apparatuses connected to server 1300 executes operations such as the generation, deletion, and moving of the virtual object, virtual object management section 1303 receives a notification from the information processing apparatus which has executed the operations, and updates the virtual object management information.

In addition, when the virtual object management information is updated, virtual object management section 1303 transmits information of the virtual object shared in each of the information processing apparatuses to the information processing apparatuses connected to server 1300, on the basis of the group management information and the shared group management information. Thereby, the virtual object management information is synchronized among the information processing apparatuses. This example will be described for a case where the group management information held in server 1300 corresponds to FIG. 12A, the shared group management information corresponds to FIG. 12B, and the virtual object management information corresponds to FIG. 2A. Information processing apparatuses 211, 212, and 213 belong to group 200, and group 200 has a sharing relationship with group 300. Thus, server 1300 transmits virtual object management information a, and virtual object management information b to information processing apparatuses 211, 212, and 213.

Reference point setting section 1304 acquires the number of virtual objects managed by each group from virtual object management section 1303. Reference point setting section 1304 then sets a reference point which is commonly used (hereinafter, referred to as a common reference point) between a plurality of groups sharing the augmented real space, on the basis of the number of virtual objects acquired.

In addition, reference point setting section 1304 acquires relative position information and apparatus position information from information processing apparatus 100A through communication section 1306. The relative position information is information generated by another terminal detection section 102 of information processing apparatus 100A, and is information indicating the relative position of another information processing apparatus sharing the augmented real space with respect to information processing apparatus 100A. The apparatus position information is information generated by own-position estimation section 109 of information processing apparatus 100A, and is information indicating the position of current information processing apparatus 100A with respect to the reference point. Reference point setting section 1304 generates reference point setting information on the basis of the relative position information and the apparatus position information. The reference point setting information is information indicating a positional relationship between the reference points of the respective groups sharing the augmented real space.

Coordinate system generation section 1305 updates the spatial coordinate system of the augmented real space used in each group, on the basis of the reference point setting information generated by reference point setting section 1304. In addition, coordinate system generation section 1305 generates information indicating the processing content at the time of updating the spatial coordinate system, that is, spatial coordinate system update information. In other words, the spatial coordinate system update information is information (information indicating a transformation rule) indicating what parallel translation and/or rotation is performed on the object.

Communication section 1306 transmits and receives the relative position information generated by another terminal detection section 102, the apparatus position information generated by own-position estimation section 109, the virtual object management information, the group management information, and the spatial coordinate system update information, to and from information processing apparatus 100A.

The configuration of server 1300 according to the present embodiment has been described above.

Next, an operation example when an augmented real space is further shared between a plurality of groups which share augmented real spaces different from each other in advance will be described with reference to FIGS. 13 and 14.

<Description of Configuration of Plurality of Groups>

First, configurations of a plurality of groups will be described with reference to FIG. 13.

Figure 13:
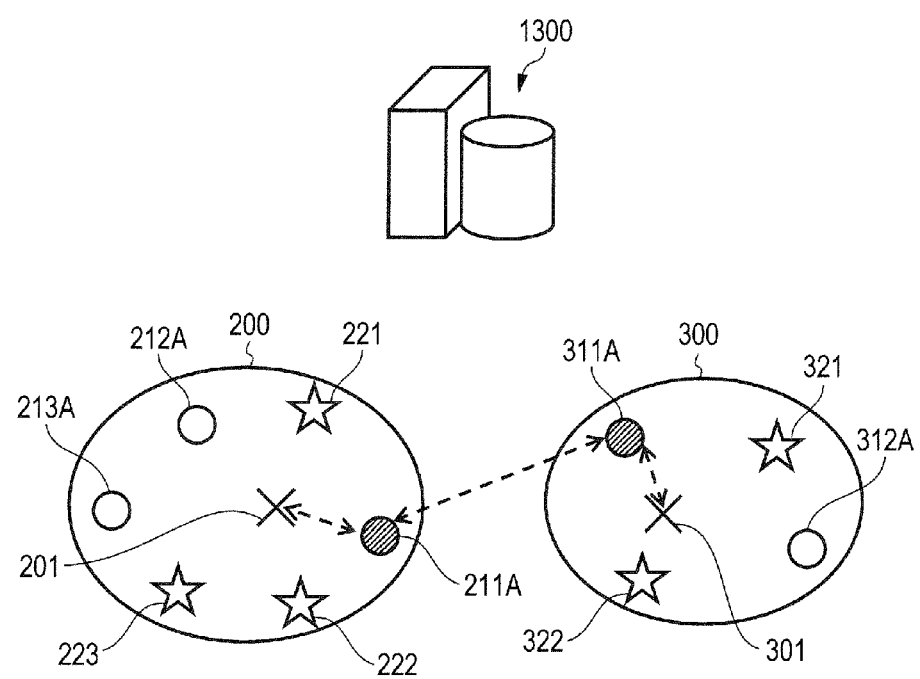
FIG. 13 is a diagram illustrating operations of the information processing apparatus according to Embodiment 4 of the present invention to share an augmented real space between two groups.

FIG. 13 is a diagram illustrating images of group 200 and group 300 which share augmented real spaces different from each other in advance.

Group 200 is formed by users sharing an augmented real space with the origin of the spatial coordinates at reference point 201. The users forming group 200 own information processing apparatuses 211A, 212A, and 213A, respectively. These information processing apparatuses each correspond to information processing apparatus 100A mentioned above. The users share virtual objects 221, 222, and 223 in the augmented real space, using the respective information processing apparatuses.

Group 300 is formed by users sharing an augmented real space with the origin of the spatial coordinates at reference point 301. The users forming group 300 own information processing apparatuses 311A and 312A, respectively. These information processing apparatuses each correspond to information processing apparatus 100A mentioned above. The users share virtual objects 321 and 322, using the respective information processing apparatuses.

Further, information processing apparatuses 211A, 212A, 213A, 311A, and 312A are connected to server 1300 through a network.

Meanwhile, in the example of FIG. 13, for the convenience of description, a description will be provided in which group 200 is provided with three information processing apparatuses and three virtual objects, and group 300 is provided with two information processing apparatuses and two virtual objects, but each of the numbers is not limited to FIG. 13.

The description of the configurations of a plurality of groups has been described above.

<Description of Operations of Information Processing Apparatus and Server>

Figure 14:
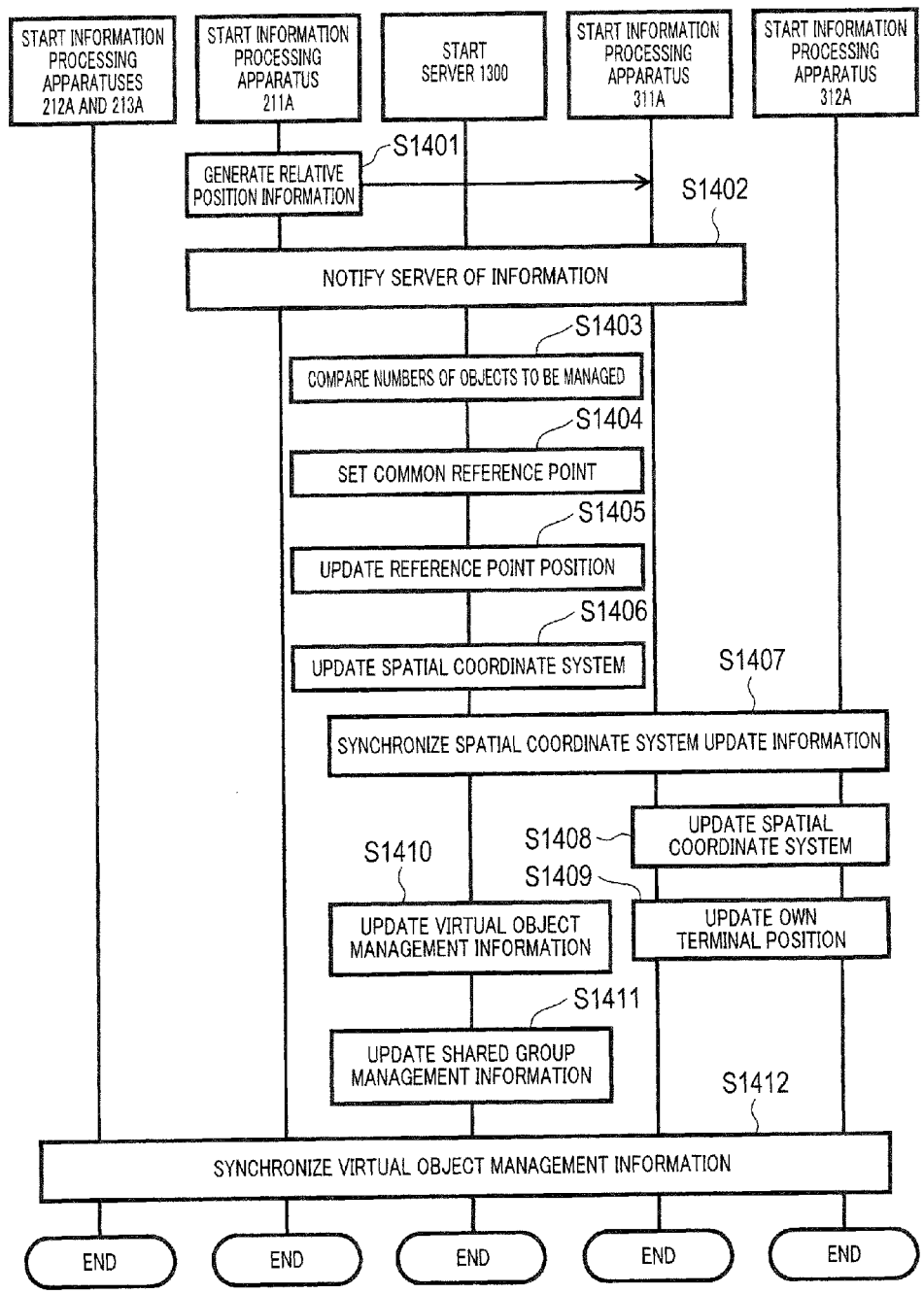
FIG. 14 is a sequence diagram illustrating processes of the information processing apparatus according to Embodiment 4 of the present invention to share the augmented real space between two groups.

FIG. 14 is a sequence diagram illustrating sharing processes of the augmented real space performed between server 1300 and information processing apparatuses 211A, 212A, 213A, 311A, and 312A.

In step S1401, information processing apparatus 211A acquires a relative position of information processing apparatus 311A with respect to information processing apparatus 211A, and generates relative position information indicating the relative position. In addition, at this time, information processing apparatus 211A also generates apparatus position information indicating a position of current information processing apparatus 211A with respect to reference point 201 (hereinafter, referred to as apparatus position information A).

In step S1402, information processing apparatus 211A notifies server 1300 of the generated relative position information and apparatus position information A. In addition, in step S1402, information processing apparatus 311A generates apparatus position information indicating a position of current information processing apparatus 311A with respect to reference point 301 (hereinafter, referred to as apparatus position information B), and notifies server 1300 of the generated information.

In step S1403, server 1300 acquires the number of virtual objects whose management group ID is managed in group 200 and the number of virtual objects whose management group ID is managed in group 300 of the management group ID from the virtual object management information, on the basis of the group management information, and compares both the numbers with each other.

In step S1404, as a result of the comparison of step S1403, server 1300 sets the reference point which is set in the group having the larger number of objects to be managed, as a common reference point. In the example of FIG. 13, the number of objects to be managed in group 200 is three, and the number of objects to be managed in group 300 is two. Thus, server 1300 sets reference point 201 which is set in group 200 having the larger number of objects to be managed, as a common reference point.

In step S1405, server 1300 updates a position of reference point 301 to the coordinates with the origin at reference point 201, on the basis of apparatus position information A, the relative position information, and apparatus position information B which are received in step S1402. Here, server 1300 generates reference point setting information indicating the position of reference point 301 with respect to reference point 201. This reference point setting information is generated by reference point setting section 1304.

In step S1406, server 1300 updates the spatial coordinate system of the augmented real space used in group 300, on the basis of the reference point setting information generated in step S1405. That is, server 1300 performs transformation from the spatial coordinate system with the origin at reference point 301 to the spatial coordinate system with the origin at reference point 201. The term "spatial coordinate system transformation" as used herein means a change of the direction of a space defined by an X-axis, a Y-axis, and a Z-axis from reference point 301A to reference point 201A. Here, server 1300 generates spatial coordinate system update information of group 300A. This spatial coordinate system update information is generated by coordinate system generation section 1305.

In step S1407, server 1300 transmits the spatial coordinate system update information generated in step S1406 to information processing apparatuses 311A and 312A belonging to group 300.

In step S1408, information processing apparatuses 311A and 312A updates the spatial coordinate system of the augmented real space used in group 300, on the basis of the spatial coordinate system update information received in step S1407.

In step S1409, information processing apparatuses 311A and 312A updates position information of the respective information processing apparatuses, on the basis of the spatial coordinate system update information received in step S1407.

In step S1410, server 1300 updates the position information (position information 404 shown in FIG. 2A) of the virtual object managed by group 300 having the reference point changed, to the coordinates with the origin at reference point 201.

In step S1411, server 1300 updates the shared group management information. In the example of FIG. 13, shared group ID 300 is set in a record in which the group ID is 200, and shared group ID 200 is set in a record in which the group ID is 300.

In step S1412, server 1300 notifies each of the information processing apparatuses connected to server 1300 of the information of the virtual object shared in each of the information processing apparatuses, on the basis of the group management information and the shared group management information, and synchronizes the virtual object management information between each of the information processing apparatuses. In the example of FIG. 13, information processing apparatuses 211A, 212A, and 213A belong to group 200, and group 200 has a sharing relationship with group 300. Thus, server 1300 transmits information of virtual objects 321 and 322 managed in group 300 to information processing apparatuses 211A, 212A, and 213A. In addition, server 1300 transmits information of virtual objects 221, 222, and 223 managed in group 200 to information processing apparatuses 311A and 312A. Thereby, the information processing apparatuses belonging to group 200 and group 300 share the information of the virtual objects managed in the respective groups.

The description has been provided for the operations performed when the same spatial information sharing process as that in Embodiment 1 is realized using the information processing apparatus and the server connected to the information processing apparatus through a network. In Embodiments 2 and 3, it is also possible to realize the above process using the server as is the case with the present embodiment. Meanwhile, when server 1300 is used in Embodiment 2, in step S1403 of FIG. 14, server 1300 acquires the numbers of objects to be managed in the respective shared groups on the basis of the group management information and the shared group management information, and compares the numbers with each other.

In this manner, in the present embodiment, some of the processes performed by the information processing apparatus in Embodiments 1 and 2 are executed in the server, and thus it is possible to reduce power consumption of each of the information processing apparatuses, and to save hardware resources required in the information processing apparatus. In addition, in the present embodiment, the central management of the group management information, the shared group management information, and the virtual object management information in the server facilitates the management of information required for sharing the augmented real space.

Description of Modified Example

As stated above, although Embodiments 1 to 4 of the present invention have been described, the above-mentioned description is merely an example, and various modifications can be made. Hereinafter, modified examples will be described.

For example, the functional blocks of reference point setting sections 103 and 1304, coordinate system generation sections 110 and 1305, and the like are typically realized by integrated circuit LSI (Large Scale Integration). These functional blocks may be individually formed in one chip, and may be formed in one chip so as to include some or all of them. Meanwhile, LSI is sometimes called IC, system LSI, super LSI, or ultra LSI, depending on the degree of integration.

The method of integrated circuit implementation is not restricted to LSI devices, and implementation may be done by dedicated circuitry or a general-purpose processor. After fabrication of an LSI device, a programmable FPGA (field-programmable gate array) or a re-configurable processor that enables reconfiguration of connections of circuit cells within the LSI device or settings thereof may be used.

Additionally, in the event of the appearance of technology for integrated circuit implementation that replaces LSI technology by advancements in semiconductor technology or technologies derivative therefrom, that technology may of course be used to integrate the functional blocks. Another possibility is the application of biotechnology or the like.

Although Embodiments 1 to 4 have been described by examples of hardware implementations, the present invention can also be implemented by software in conjunction with hardware.

An information processing apparatus according to the disclosure described above is an apparatus that belongs to a group sharing an augmented real space which is constructed based on a predetermined reference point and in which a virtual object is disposed in association with a position of a real space. The information processing apparatus includes: a virtual object management section that manages virtual object management information of the information processing apparatus, the virtual object management information including information on a virtual object disposed in an augmented real space shared by a group to which the information processing apparatus belongs; a communication section that receives virtual object management information of another information processing apparatus from this other information processing apparatus belonging to another group, the virtual object management information including information on a virtual object disposed in an augmented real space shared by the other group; and a reference point setting section that sets a common reference point based on the virtual object management information of the information processing apparatus and the virtual object management information of the other information processing apparatus, the common reference point being commonly used by the other group and the group to which the information processing apparatus belongs.

In the information processing apparatus according to this disclosure: the reference point setting section compares the number of virtual objects received as the virtual object management information of the other information processing apparatus with the number of virtual objects managed as the virtual object management information of the information processing apparatus; and the reference point setting section sets a reference point used in a group having the larger number of virtual objects to the common reference point as a result of the comparison.

In the information processing apparatus according to this disclosure: when setting, to a common reference point, a reference point used by the group to which the information processing apparatus belongs, the reference point setting section transmits reference point setting information on the common reference point to the other information processing apparatus via the communication section; and the virtual object management section receives virtual object management information of the other information processing apparatus which is updated based on the common reference point from the other information processing apparatus via the communication section and holds the received virtual object management information together with the virtual object management information of the information processing apparatus.

In the information processing apparatus according to this disclosure, the virtual object management section transmits, via the communication section, virtual object management information obtained by combining the object management information of the information processing apparatus with the virtual object management information of the other apparatus to another information processing apparatus within the group to which the information processing apparatus belongs.

In the information processing apparatus according to this disclosure: when setting a reference point used by the other group to a common reference point, the reference point setting section transmits setting notification information indicating that the reference point is set to the common reference point to the other information processing apparatus via the communication section; the reference point setting section receives reference point setting information on the common reference point from the other information processing apparatus via the communication section; and the virtual object management section updates the virtual object management information of the information processing apparatus based on the received reference point setting information.

In the information processing apparatus according to this disclosure, the virtual object management section transmits, via the communication section, the reference point setting information, and the virtual object management information of the information processing apparatus which is updated based on the reference point setting information acquired from the other information processing apparatus, to another information processing apparatus within the group to which the information processing apparatus belongs.

In the information processing apparatus according to this disclosure, when the group to which the information processing apparatus belongs or the other group is in a relationship of sharing the same augmented real space with a different group in advance, the reference point setting section performs the comparison based on the total number of virtual objects disposed in the same augmented real space.

A server apparatus according to the disclosure described above is configured to communicate, through a network, with a plurality of information processing apparatuses that belong to a group sharing an augmented real space which is constructed based on a predetermined reference point and in which a virtual object is disposed in association with a position of a real space. The server apparatus includes: a virtual object management section that manages first virtual object management information including information on a virtual object disposed in a first augmented real space shared by a first group to which a first information processing apparatus belongs, and second virtual object management information including information on a virtual object disposed in a second augmented real space shared by a second group to which a second information processing apparatus belongs; and a reference point setting section that sets a common reference point based on the first virtual object management information and the second virtual object management information, the common reference point being commonly used by the first group and the second group.

In the server apparatus according to this disclosure: the reference point setting section compares the number of virtual objects managed as the first virtual object management information with the number of virtual objects managed as the second virtual object management information; and the reference point setting section sets a reference point used in a group having the larger number of virtual objects to the common reference point as a result of the comparison.

In the server apparatus according to this disclosure, when the first group to which the first information processing apparatus belongs or the second group to which the second information processing apparatus belongs is in a relationship of sharing the same augmented real space with a different group in advance, the reference point setting section performs the comparison based on the total number of virtual objects disposed in the same augmented real space.

An information processing method according to the disclosure described above is to be performed by an information processing apparatus that belongs to a group sharing an augmented real space which is constructed based on a predetermined reference point and in which a virtual object is disposed in association with a position of a real space. The information processing method includes: managing virtual object management information of the information processing apparatus performing the information processing method, the virtual object management information including information on a virtual object disposed in the augmented real space shared by the group to which the information processing apparatus belongs; receiving virtual object management information of another information processing apparatus from this other information processing apparatus belonging to another group, the virtual object management information including information on a virtual object disposed in an augmented real space shared by the other group; and setting a common reference point based on the virtual object management information of the information processing apparatus and the virtual object management information of the other information processing apparatus, the common reference point being commonly used by the other group and the group to which the information processing apparatus belongs.

The disclosure of Japanese Patent Application No. 2012-071031, filed on Mar. 27, 2012, including the specification, drawings, and abstract, is incorporated herein by reference in its entirety.

INDUSTRIAL APPLICABILITY

The information processing apparatus, server apparatus, and information processing method according to the present invention are useful in smartphones, cellular phones, portable terminals, digital still cameras and the like in which the processing amount of an information processing apparatus owned by a user can be suppressed by sharing augmented real spaces different from each other between groups, using augmented reality technology.

REFERENCE SIGNS LIST 100, 211, 212, 213, 311, 312, 911, 912, 1011, 1012 Information processing apparatus
101 Image acquisition section
102 Another terminal detection section
103 Reference point setting section
104 Virtual object management section
105 Group management section
106 Own terminal management section
107 Communication section
108 Position and posture measurement section
109 Own-position estimation section
110 Coordinate system generation section
111 Output image creation section
112 Image output section
200, 300, 900, 1000 Group sharing augmented real space in advance
201, 301, 901, 1001 Reference point
221, 222, 223, 321, 322, 921, 922, 1021 Virtual object
1300 Server
1301 Group management section
1302 Shared group management section
1303 Virtual object management section
1304 Reference point setting section
1305 Coordinate system generation section
1306 Communication section

The invention claimed is:

1. An information processing apparatus that belongs to a group sharing an augmented real space which is constructed based on a predetermined reference point and in which a virtual object is disposed in association with a position of a real space, the information processing apparatus comprising:
   a virtual object management section that manages virtual object management information of the information processing apparatus, the virtual object management information including information on a virtual object disposed in an augmented real space shared by a group to which the information processing apparatus belongs;
   an image acquisition section that acquires from an image capturing apparatus an image of the real space and an image of another information processing apparatus belonging to another group and sharing the augmented real space with the information processing apparatus;
   another terminal detection section that generates a relative position of the other information processing apparatus with respect to information processing apparatus by detecting the image of the other information processing apparatus from the image acquired by the image acquisition section;
   a communication section that receives virtual object management information of the other information processing apparatus from this other information processing apparatus, the virtual object management information including information on a virtual object disposed in an augmented real space shared by the other group; and
   a reference point setting section that sets a common reference point based on the virtual object management information of the information processing apparatus and the virtual object management information of the other information processing apparatus, the common reference point being commonly used by the other group and the group to which the information processing apparatus belongs, wherein
   the setting of the common reference point is performed between a representative information processing apparatus belonging to the group and a representative information processing apparatus belonging to the other group, and
   the common reference point is selected based on the relative position of the other information processing apparatus.

2. The information processing apparatus according to claim 1, wherein:
   the reference point setting section compares the number of virtual objects received as the virtual object management information of the other information processing apparatus with the number of virtual objects managed as the virtual object management information of the information processing apparatus; and
   the reference point setting section sets a reference point used in a group having the larger number of virtual objects to the common reference point as a result of the comparison.

3. The information processing apparatus according to claim 2, wherein, when the group to which the information processing apparatus belongs or the other group is in a relationship of sharing the same augmented real space with a different group in advance, the reference point setting section performs the comparison based on the total number of virtual objects disposed in the same augmented real space.

4. The information processing apparatus according to claim 1, wherein:
   when setting, to a common reference point, a reference point used by the group to which the information processing apparatus belongs, the reference point setting section transmits reference point setting information on the common reference point to the other information processing apparatus via the communication section; and
   the virtual object management section receives virtual object management information of the other information processing apparatus which is updated based on the common reference point from the other information processing apparatus via the communication section and holds the received virtual object management information together with the virtual object management information of the information processing apparatus.

5. The information processing apparatus according to claim 4, wherein the virtual object management section transmits, via the communication section, virtual object management information obtained by combining the object management information of the information processing apparatus with the virtual object management information of the other apparatus to another information processing apparatus within the group to which the information processing apparatus belongs.

6. The information processing apparatus according to claim 1, wherein:
   when setting a reference point used by the other group to a common reference point, the reference point setting section transmits setting notification information indicating that the reference point is set to the common reference point to the other information processing apparatus via the communication section;
   the reference point setting section receives reference point setting information on the common reference point from the other information processing apparatus via the communication section; and
   the virtual object management section updates the virtual object management information of the information processing apparatus based on the received reference point setting information.

7. The information processing apparatus according to claim 6, wherein the virtual object management section transmits, via the communication section, the reference point setting information, and the virtual object management information of the information processing apparatus which is updated based on the reference point setting information acquired from the other information processing apparatus, to another information processing apparatus within the group to which the information processing apparatus belongs.

8. A server apparatus configured to communicate, through a network, with a plurality of information processing apparatuses that belong to a group sharing an augmented real space which is constructed based on a predetermined reference point and in which a virtual object is disposed in association with a position of a real space, the server apparatus comprising one or more integrated circuits configured to:
   manage first virtual object management information including information on a virtual object disposed in a first augmented real space shared by a first group to which a first information processing apparatus belongs, and second virtual object management information including information on a virtual object disposed in a second augmented real space shared by a second group to which a second information processing apparatus belongs; and
   set a common reference point based on the first virtual object management information and the second virtual object management information, the common reference point being commonly used by the first group and the second group, wherein the setting of the common reference point is performed between representative information processing apparatuses of the first group and the second group.

9. The server apparatus according to claim 8, wherein:

the number of virtual objects managed as the first virtual object management information is compared with the number of virtual objects managed as the second virtual object management information; and a reference point used in a group having the larger number of virtual objects to the common reference point is set as a result of the comparison.

10. The server apparatus according to claim 8, wherein, when the first group to which the first information processing apparatus belongs or the second group to which the second information processing apparatus belongs is in a relationship of sharing the same augmented real space with a different group in advance, the comparison is performed based on the total number of virtual objects disposed in the same augmented real space.

11. An information processing method to be performed by an information processing apparatus that belongs to a group sharing an augmented real space which is constructed based on a predetermined reference point and in which a virtual object is disposed in association with a position of a real space, the information processing method comprising:

managing virtual object management information of the information processing apparatus performing the information processing method, the virtual object management information including information on a virtual object disposed in the augmented real space shared by the group to which the information processing apparatus belongs;

receiving virtual object management information of another information processing apparatus from this other information processing apparatus belonging to another group, the virtual object management information including information on a virtual object disposed in an augmented real space shared by the other group; and setting a common reference point based on the virtual object management information of the information processing apparatus and the virtual object management information of the other information processing apparatus, the common reference point being commonly used by the other group and the group to which the information processing apparatus belongs, wherein the setting of the common reference point is performed between a representative information processing apparatus belonging to the group and a representative information processing apparatus belonging to the other group.

* * * * *